（12）United States Patent
Sommers

(10) Patent No.: US 12,516,573 B2
(45) Date of Patent: *Jan. 6, 2026

(54) CONCRETE SLAB REBAR HOLE DOWELING CART

(71) Applicant: Joshua E. Sommers, Shiocton, WI (US)

(72) Inventor: Joshua E. Sommers, Shiocton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/912,514

(22) Filed: Oct. 10, 2024

(65) Prior Publication Data

US 2025/0034945 A1 Jan. 30, 2025

Related U.S. Application Data

(63) Continuation of application No. 17/976,621, filed on Oct. 28, 2022, now Pat. No. 12,116,892.

(51) Int. Cl.
*E21B 7/02* (2006.01)
*B62B 1/12* (2006.01)
*B62B 1/26* (2006.01)
*E04G 21/12* (2006.01)

(52) U.S. Cl.
CPC ............... *E21B 7/028* (2013.01); *B62B 1/12* (2013.01); *B62B 1/26* (2013.01); *B62B 2202/48* (2013.01); *E04G 21/12* (2013.01); *Y10T 408/655* (2015.01); *Y10T 408/675* (2015.01); *Y10T 408/91* (2015.01)

(58) Field of Classification Search
CPC ............. Y10T 408/655; Y10T 408/675; Y10T 408/91; B62B 5/064; B62B 5/00; B62B 1/26; E21B 7/028
See application file for complete search history.

(56) References Cited

U.S. PATENT DOCUMENTS

| 4,736,804 A | 4/1988 | Geibel |
| 4,813,499 A | 3/1989 | McNulty |

(Continued)

OTHER PUBLICATIONS

Bosch T1657 Hammer Hauler Cart, Robert Bosch, GmbH of Germany, at least as early as Jan. 2020; https://www.amazon.com/Bosch-T1657-Hammer-Hauler-Cart/dp/B00002246E.

(Continued)

*Primary Examiner* — Robert E Fuller
(74) *Attorney, Agent, or Firm* — Jeffrey S. Sokol

(57) ABSTRACT

The present application pertains to a rebar hole doweling cart to construct or repair sidewalks, driveways, roadways, curbs, floors and the like. The cart has a frame with wheels, an elongated upwardly extending riser with a handle, and a nose piece that pivotally supports a drill mounting assembly near the ground. The mounting assembly holds an electric hammer drill and its bit in an aimed direction. The cart is rolled forward to tap a hole in a concrete slab and place the bit in a set aimed direction. The cart handle is then pushed forward with the nose piece in gripping engagement with the ground to advance the drill bit forward to form the rebar hole in the slab. During this forward handle rotation, the drill mounting assembly simultaneously counter-rotates (pitch pivotal movement) relative to the nose piece to substantially maintain the drill bit in its set aimed direction.

14 Claims, 17 Drawing Sheets

(56) References Cited

U.S. PATENT DOCUMENTS

| | | | | |
|---|---|---|---|---|
| 5,137,235 | A | * | 8/1992 | Wentworth .......... B25H 1/0035 |
| | | | | 254/105 |
| 6,481,507 | B1 | | 11/2002 | Kromray, Jr. |
| 7,617,885 | B2 | * | 11/2009 | Howland .................. B25F 5/00 |
| | | | | 173/171 |
| 10,487,583 | B2 | | 11/2019 | Jerjevic |

OTHER PUBLICATIONS

E-Z Drill 210B SRA Slab Rider, E-Z Drill, Inc., Perry, OK; at least as early as Jan. 2020; https://www.ezdrill.com/drills/single-drills/210b-sra-slab-rider/.

Hilti TE 60 AVR Rotary Hammer, Hilti Corp. Schaan, Liechtenstein, at least as early as Jan. 2020; https://www.hilti.com/c/CLS_POWER_TOOLS_7124/CLS_ROTARY_HAMMERS_SDSMAX_7124.

* cited by examiner

CONCRETE SLAB REBAR HOLE DOWELING CART

TECHNICAL FIELD OF THE INVENTION

The invention relates to a doweling cart that pivotally holds a hammer drill near the ground, taps the rebar hole to place the drill bit in a set aimed direction, and grippingly engages the ground to produce a manually-generated leveraged pushing force to drill rebar or dowel holes into a slab of concrete while maintaining the drill bit in its set aimed direction when constructing or repairing sidewalks, driveways, roads, curbs, floors and the like.

BACKGROUND OF THE INVENTION

Sidewalks, driveways, roads and curbing are typically constructed section-by-section. Each section is poured after a previously poured adjacent section cures. To maintain the flush alignment of the upper surfaces of adjacent sections, they are joined by multiple, spaced apart lengths of metal dowels or rebar. Dowels are typically used to join thicker slabs of concrete, such as airport runways, highways and the like. Rebar is typically used to join less thick slabs, such as sidewalks, driveways, garages, residential building floors, and the like. The length of the dowels or rebar depend on the particular job. The dowels and rebar are typically straight, of equal or similar length, and sufficiently long to allow them to extend at least a desired distance into both adjacent sections of concrete.

Notwithstanding initial construction techniques, over time, sections of sidewalks, driveways and roads can crack, heave, become pitted or otherwise show signs of excessive wear due to the ground settling, freezing and thawing, or due to rain, snow or ice. Uneven and pitted conditions in sidewalk, garages and driveways lead to safety hazards because people can trip, stumble or fall. Uneven and pitted conditions in roads and highways can lead to or contribute to vehicle accidents.

Repairing concrete sidewalks, driveways, garage floors, building floors, roads and curbing is labor-intensive work. Damaged sections are removed, and new concrete section are poured between existing adjacent sections. Once the damaged section is removed, horizontal dowel or rebar holes are drilled into the existing adjacent sections or slabs. Half of the rebar is inserted into the hole, and half extends into the area where the new section is to be poured. When the new section of concrete is poured, the rebar joins the newly poured section with the existing section to help keep the adjacent sections aligned so their upper surfaces remain flush or even.

Drilling rebar or dowel holes into hardened concrete slabs is difficult and unpleasant work. One problem with drilling these holes is the awkward body position of the worker due to the location and geometry of the slabs and holes. The concrete slabs are located on the ground, and are typically four to ten inches (4" to 10") thick. The dowel or rebar holes are intended to be drilled about half way up the height of the slab (mid-slab) and substantially planar to the upper surface of the slab, so that the holes do not come unnecessarily close to the surface, which could weaken the slab and expose rebar. Given the location and geometry of the slab and holes, workers typically have to kneel or lay down on the ground to drill the holes. Yet, working while kneeling or laying down is messy and dangerous. On cold wet days, the worker will need to kneel or lay in the snow, water or mud. Even on dry moderate days, dirt, dust and debris from drilling the hole can blow into the face of the worker, which causes eye or throat irritation and slows the rate of work. To drill a rebar or dowl hole in a reasonable time with a hammer drill, the worker typically applies about thirty-five foot pounds (35 lbf) of force to the drill, which becomes a fatiguing job when drilling many holes. Moreover, should the drill bit stick or catch and cause the drill housing to kick or violently rotate, the awkward body position of the worker and close proximity to the ground can cause his or her hand, wrist, arm or shoulder to move unnaturally or impact the ground or an adjacent object, which is painful and can result in significant injury.

Another problem with drilling rebar or dowel holes is producing the forward force needed for the drill bit to effectively cut into the slab. Concrete is a dense material that can require significant pressure to cut through. The greater the forward or longitudinal force of the drill bit, the more quickly the bit will form the hole. Yet, when a worker is kneeling or lying down on the ground, producing the necessary force to efficiently drill the holes is awkward and problematic. Because of the body position of the worker, manually generating the necessary pressure to quickly drill the hole is difficult. Using leg strength or weight of the worker is difficult or impossible. The arm and shoulder strength of the worker can fatigue and reduce job efficiency.

A further problem with drilling rebar or dowel holes is that once the hole reaches a particular depth, the lateral (non-linear) movement of the drill bit is inhibited by the sides of the hole. When at or beyond this laterally locked depth, the drill bit will only move longitudinally (linearly) in and out of the hole. The sides of the hole inhibit lateral movement or angling of the drill bit relative to the hole. The drill must be substantially directly aligned with the hole so that its drill bit can continue drilling into the concrete to the desired hole depth.

A still further problem with drilling rebar or dowel holes is that the drill bit moves when starting the hole. The combination of the rotation of the drill bit, density of the concrete, and hand force applied to the drill bit cause the bit to move or wander on the vertical surface of the slab. As a result, locating the rebar or dowel holes at the desired mid-slab location is difficult, which causes erratic hole placement and reduces worker efficiency.

The present invention is intended to solve these and other problems.

BRIEF DESCRIPTION OF THE INVENTION

The present invention relates to a rebar hole doweling cart that pivotally holds an electric hammer drill near the ground with its bit in a set aimed direction, and grippingly engages the ground to produce a manually-generated leveraged pushing force to drill generally horizontal rebar or dowel holes into a slab of concrete to construct or repair sidewalks, driveways, roadways, curbing and the like. The cart has a frame, wheels, an elongated handle, a nose plate and a drill mounting assembly. The wheels position the drill in front of the concrete slab. The elongated, upwardly extending handle is manually pushed forward to pivot the nose plate into gripping engagement with the ground to advance the drill forward. The mounting assembly holds the drill in a forward-facing position and pivots to maintain the set aimed direction of the drill bit as it advances to form the hole.

One advantage of the doweling cart is its ergonomic design. The doweling cart has an elevated handle that allows workers to remain standing and use the weight of their body to drill rebar or dowel holes in concrete slabs near ground level. The worker pushes the cart handle forward and backward in a stroking manner to drill the rebar or dowel holes. Drilling the rebar or dowel holes is performed more safely and efficiently. The worker avoids awkward kneeling or laying down body positions while exerting significant pushing force to drill holes into the vertical side of a concrete slab. Contact with snow, water and mud with clothing is minimized or avoided, and dirt, dust and debris remain at a distance from the eyes, mouth and face of the worker, which improves worker safety and efficiency. Safety is also improved because the worker does not directly hold the drill should it kick when the drill bit catches inside the hole.

Another advantage of the present rebar hole doweling cart is the amount of forward force it generates to effectively advance the drill bit into the concrete slab. Although concrete is a dense material, the cart utilizes leverage to generate sufficient forward force to allow the brill bit to cut through the slab. The manually-generated and leveraged drilling force produced by the cart enables the drill to quickly form the holes. The worker uses his or her weight to help generate the leveraged forward drill bit force, which reduces the amount of arm and shoulder strength need to form the holes.

A further advantage of the rebar hole doweling cart is its use of and cooperation with the restricted lateral movement of the drill bit when forming rebar or dowel holes in concrete. When at or beyond a laterally locked hole depth, the worker tilts the handle back to lift the nose plate up off the ground, resets the pivot point of the front end of the nose plate, and then repeats the forward tilting of the handle to drill the hole even deeper into the concrete slab. Because the nose plate lifts off the ground, the drill bit is not pulled out of the hole during the backward tilting motion. The worker can also use a footpad to prevent rearward movement of the cart when resetting the pivot point. The drill remains aligned with and the bit remains inside the rebar hole so that it can continue drilling into the concrete to a desired hole depth.

A still further advantage of the rebar hole doweling cart is its adjustability to accommodate different heights or thicknesses of concrete slabs. The horizontal rebar holes are substantially planar to the upper and lower surfaces of the slab and remain spaced from its upper surface so that they do not come unnecessarily close to these surfaces. In one embodiment, the drill mounting assembly includes a mounting plate with a rear block that that allows the nose plate to pivotally lift the drill bit to a desired hole height. In other embodiments, the drill mounting assembly includes a height adjustment mechanism that allows the drill to be set at a desired height above the ground to form rebar holes at a desired hole height.

A still further advantage of the rebar hole doweling cart is the stability of the drill bit when tapping and drilling a hole. The cart firmly holds the drill so that its rotating bit does not wander from side-to-side or up and down, which is particularly important when tapping the hole. The cart maintains the drill bit at the desired height and location to further improve hole quality and worker efficiency.

A still further advantage of the rebar hole doweling cart is its practical and economic design. The doweling cart is reasonably light-weight does not require heavy and expensive hydraulic or pneumatic mechanisms. The cart allows a worker to manually generate the longitudinal force need to drill dowel holes into hardened concrete slabs.

Other aspects and advantages of the invention will become apparent upon making reference to the specification, claims and drawings.

DESCRIPTION OF THE PREFERRED EMBODIMENTS

Figure 2:
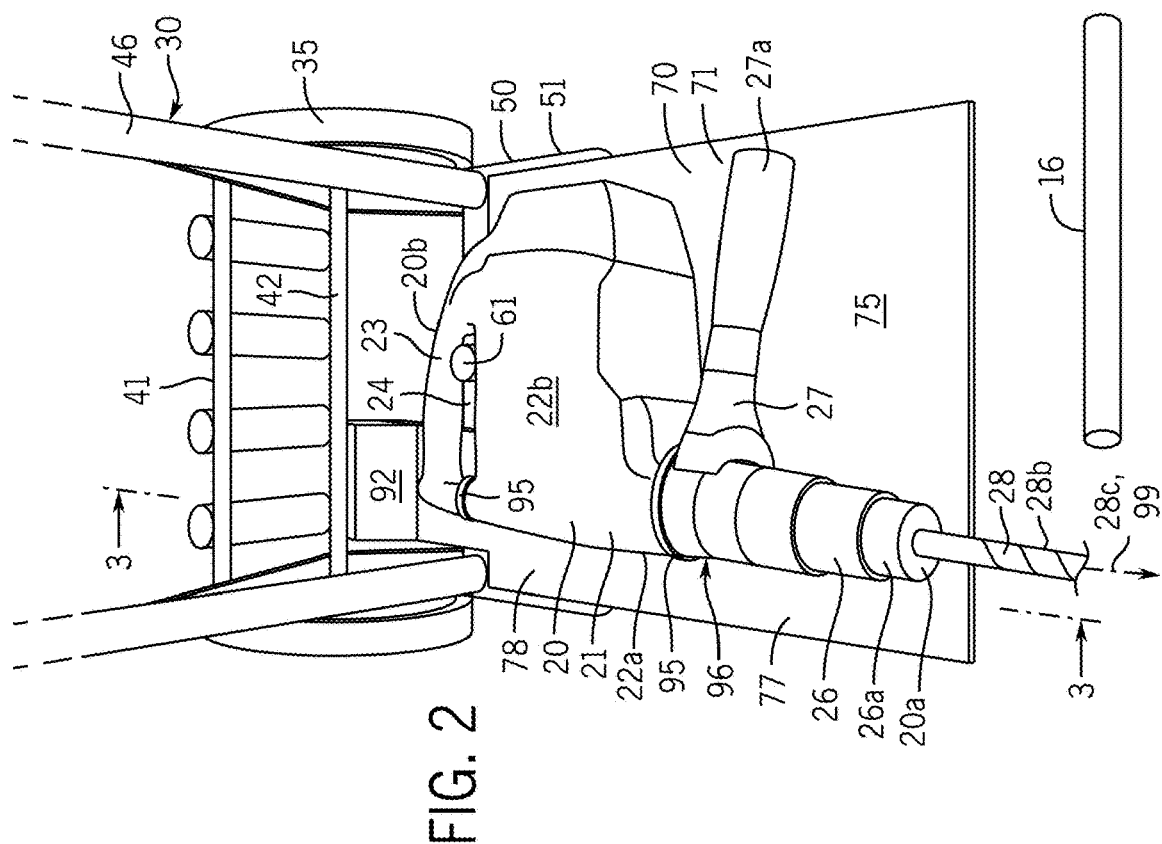
FIG. 2 is a perspective view of the first embodiment of the drill cart with a hammer drill positioned with its side laying against and the drill being secured to the drill mounting plate of the cart.

While this invention is susceptible of embodiment in many different forms, the drawings show and the specification describes in detail preferred embodiments of the invention. It should be understood that the drawings and specification are to be considered an exemplification of the principles of the invention. They are not intended to limit the broad aspects of the invention to the embodiments illustrated.

Concrete sidewalks, driveways and roads are formed on the ground 2, which typically includes a sublayer of sand, gravel or dirt as shown in FIG. 3-8. The ground 2 is generally flat or evenly sloped to define the ground level 4. The ground or sublayer 2 is solid when engaged by a force spread out over its surface 4, but will form a slight detent 5 when engaged with sufficient force by a tool or device having a thin edge or one or more spiked tips. The depth of the detent 5 depends on the amount of force applied, weather conditions (e.g., wet, dry, frozen, etc.), the type of ground or sublayer 2 involved (e.g., sand, gravel, dirt, etc.) and the shape or geometry of the tool or device forming the detent. The concrete slab 7 has upper and lower surfaces 8a and 8b and side surfaces 9. The upper and lower surfaces 8a and 8b define the thickness of the slab 7 and are generally flat and planar. The side surface or surfaces 9 are generally vertical, flat and perpendicular to the upper and lower surfaces 8a and 8b.

Rebar or dowel holes 10 are formed into one side 9 of the slab 7. The holes 10 are formed at uniformly spaced distances (e.g., 18 inches apart) along the side 9 of the slab 7. The holes 10 are formed at a desired hole height as close to a central 9a location or half way up the side as possible, and within a slab side middle region 9b within a range of plus or minus ten percent of the wall height or between about ⅖ and ⅗ the height of the vertical side 9. Each hole 10 has a tubular side surface that defines the hole diameter and a rear wall. Each hole 10 receives a length of rebar or a dowel 16 to join the existing cured concrete section 7 to an adjacent concrete section being poured. Dowels and pieces of rebar 16 are linear and have circular cross-section shapes. The outer surface of a piece of rebar is typically rough. The outer surface of a dowel is typically smooth. Each dowel or piece of rebar 16 extends about half way into the existing slab 7 and about half way into the section being poured. Once the poured section hardens or cures, the two slabs 7 are held in alignment by the pieces of rebar or dowels 16 so that their upper surfaces 8a remain in planar alignment.

Figure 4:
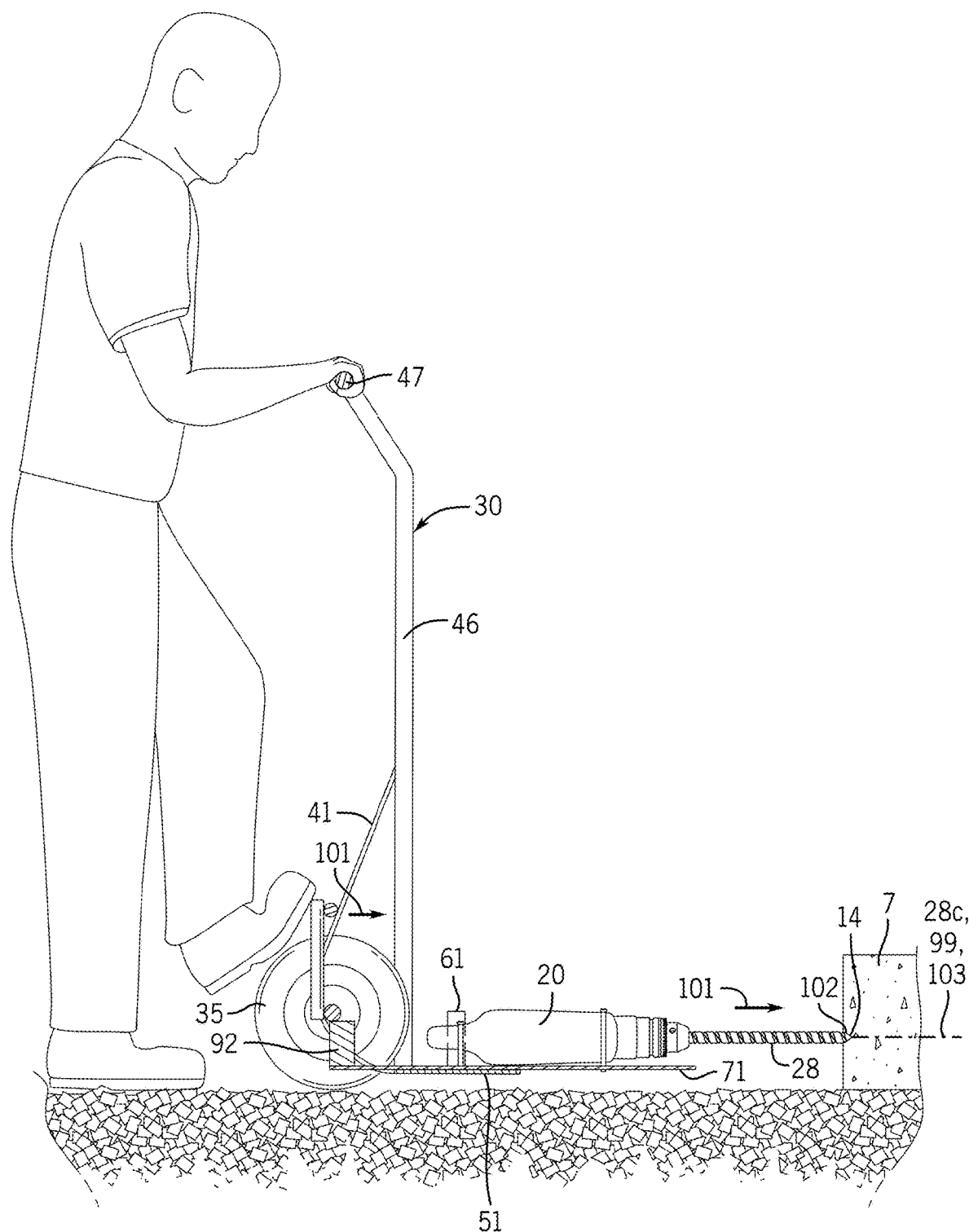
FIG. 4 is a side view of the first embodiment of the cart with the worker pushing the foot pad of the cart to push the tip of the drill bit into the concrete slab to form a tap hole at the desired hole height to set the aimed direction of the drill bit.
Figure 8:
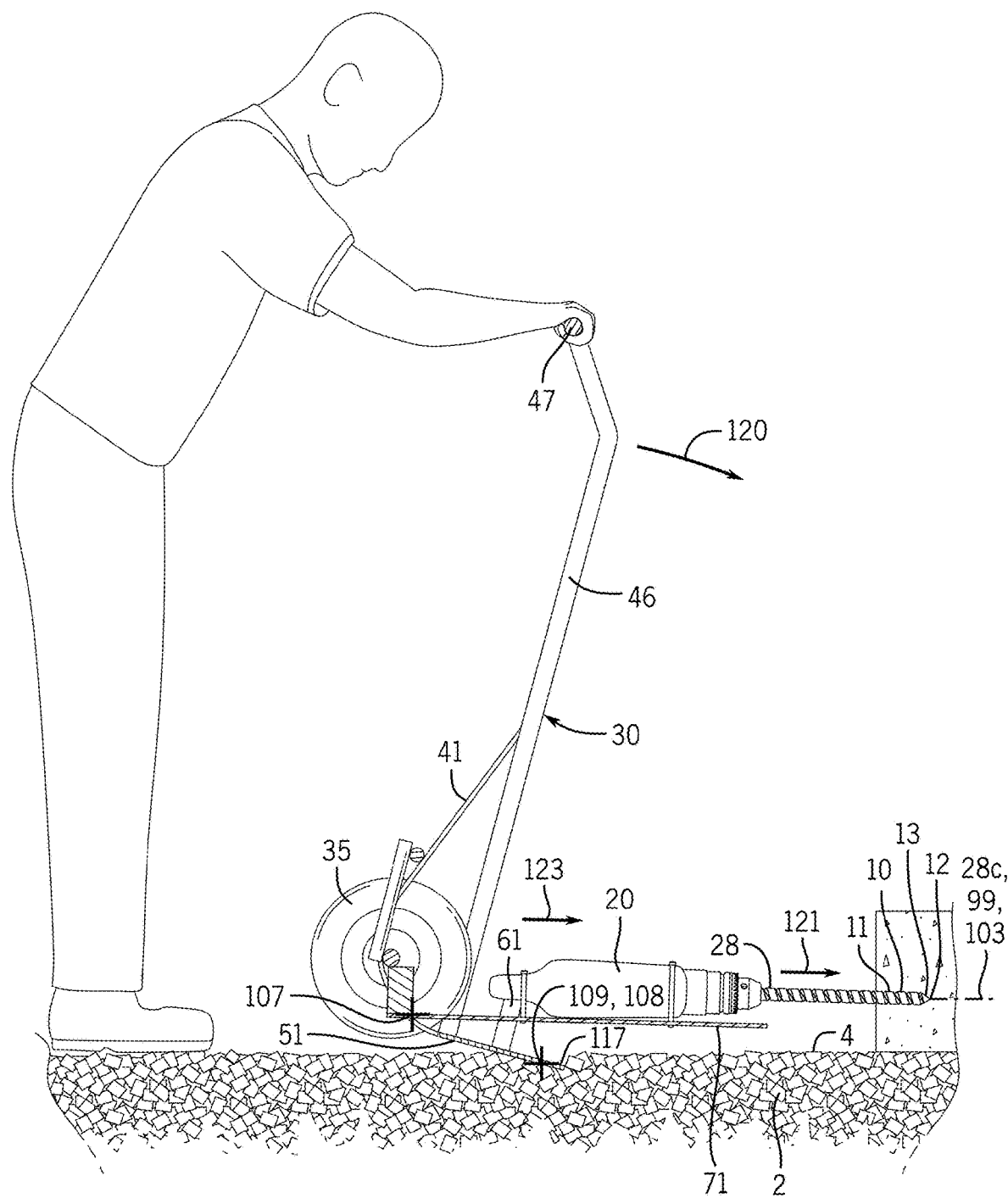
FIG. 8 is a side view of the first embodiment of the cart with the worker repeating the step of pushing or rotating the cart handle forward and with the front end of the nose plate gripping the ground at a reset second pivot point by forming a second more forward detent in the surface of the ground to further advance the drill bit deeper into the concrete.

Rebar or dowel holes 10 are drilled into the side 9 of the concrete slab 7 to a desired diameter and depth 13 as shown in FIG. 8. The distance between the side surface 9 and the rear wall 12 is the hole depth 13. Although the diameter and depth 13 of the holes 10 depends on the particular project, rebar holes for a typical four-inch thick sidewalk slab 7 have diameters of about one-half inch and depths of about seven inches. A six-inch thick driveway slab has rebar holes 10 with diameters of about one-half inch and depths of about seven inches. A ten-inch thick road slab has dowel holes with diameters of about one to two inches and depths of about six inches. When the hole 10 is being initially formed or tapped 14, the hole has a shallow tap depth 14a of about one quarter to one half inch as shown in FIG. 4. When the hole 10 is formed to a sufficient fixed depth 15 as in FIG. 6, the drill bit 28 is free to rotate axially and longitudinally inside the hole 10, but is fixed inside the hole so that the bit will not move translationally (side-to-side, or up or down) or rotationally (sideward or yaw) or up or down (pitch) within the hole, as discussed below. An open area 17 is provided in front of the side wall 9 of the slab 7 so that a worker has sufficient room to form the rebar holes 10.

Figure 3:
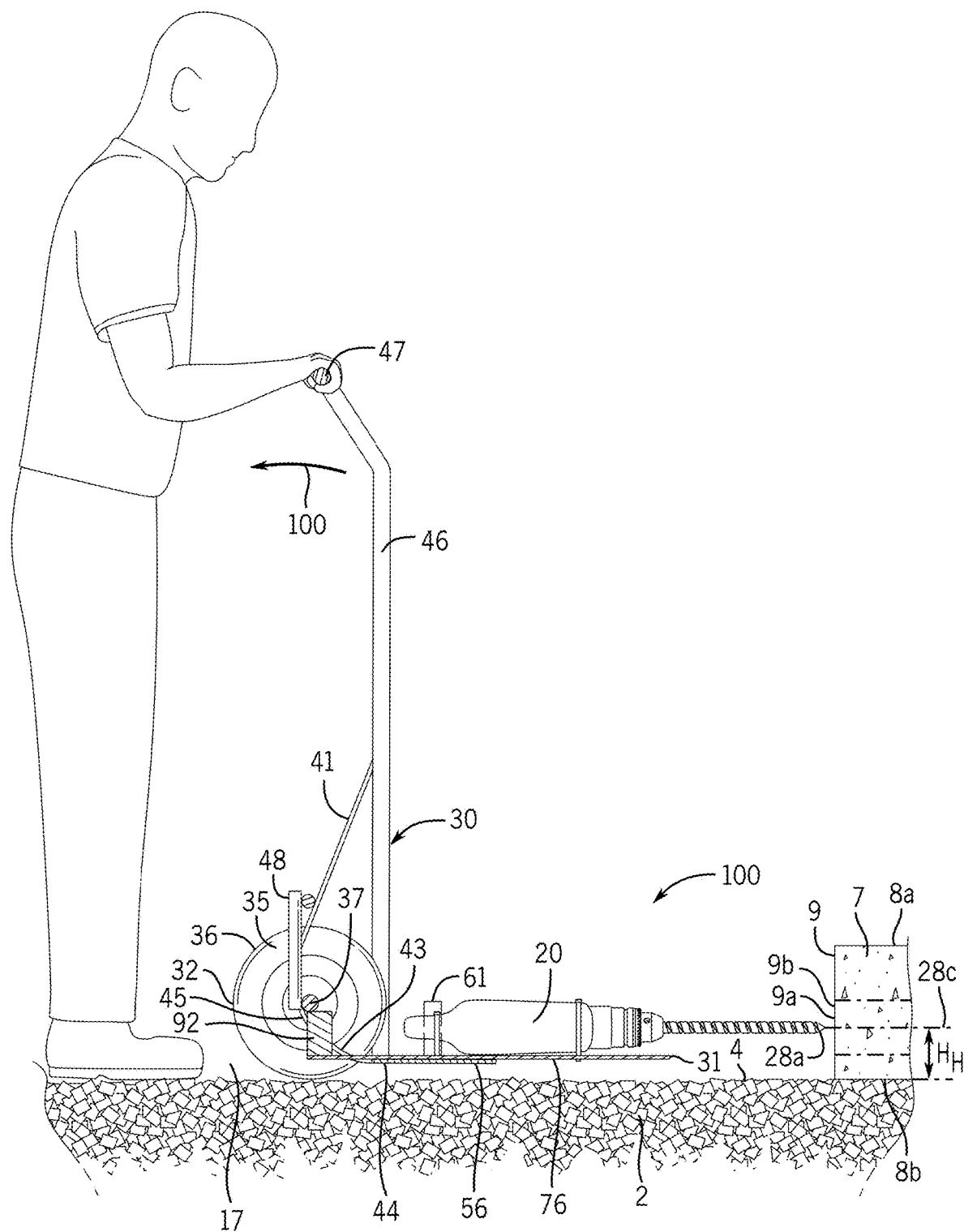
FIG. 3 is a side view of the first embodiment of the cart being used by a worker to lift the nose plate, drill mounting plate and drill above the ground, and position the drill next to a concrete slab with its drill bit at a desired hole height ($H_H$).

An electric power drill 20 forms the rebar or dowel holes 10. For many construction and repair jobs, the drill 20 is a hand-held, electric hammer drill for concrete work, similar to those manufactured by the companies such as Hilti, Bosch, Milwaukee Tool, or the like. A typical drill 20 has about a 10 to 15 amp motor that delivers about 450 rpm and about 5 to 8 ft/lbs of impact energy. As shown in FIGS. 2 and 3, the electric drill 20 has front and rear ends 20a and 20b and a housing 21 with top and side surfaces 22a and 22b. A handle 23 is positioned at the lower rear 20b of the housing 21. The housing 21 and its handle 23 form a hand opening 24 defined by front, rear and side walls 24a, 24b and 24c. The handle 23 has a trigger 25 located on the rear wall 24b. Proximal its front end 20a, is a narrower neck 26 with a selectively rotatable chuck 26a and a grip bar 27. The chuck 26a removably secures an elongated, linear drill bit 28. The drill bit 28 has a cylindrical and linear shape with a tip 28a and a uniform circular side surface 28b cross-sectional shape. The shank of the bit 28 is locked in place by a chuck 26a at the front 20a of the drill 20. The working portion of the bit 28 extends linearly about one foot from the chuck 26a in a forward aimed direction 28c. The grip bar 27 has a removable portion 27a that is secured to the grip bar by a threaded fastener (not shown). An electric cord 29 extends from the bottom end of the handle 23. When in use, the cord 29 is plugged into an electrical outlet or generator (not shown) to provide a source of power to the drill 20. Although the drill 29 is shown with a power cord 29, it should be understood that the source of power can be a battery, so that the cord is not needed.

First Embodiment of Rebar Hole Doweling Cart

A first embodiment of the rebar hole doweling cart 30 is shown in FIGS. 1-8. The cart 30 has front and rear ends 31 and 32, right and left wheels 35, a frame 41, a nose piece 50 and a drill mounting assembly 70. The cart 30 has a weight of about twenty pounds, a height of about four feet, a width of about fourteen inches, and a length of about two and a half feet, excluding the drill bit projection. Each wheel 35 has an outer tread surface 36 that rolls on the ground 2. The wheels 35 are about eight inches in diameter, spaced apart to define the width of the cart 30, and can be either solid or pneumatic. The wheels 35 rotate about a central axle 37, which defines a common axis of rotation 38 for both wheels 35.

The frame 41 includes a ridged wheel axle sleeve 42 about one foot in length. The wheel axle 37 is held by bushings secured inside the tubular sleeve 42 in a conventional manner. The frame 41 is preferably made of metal such as steel, and its components are welded or otherwise rigidly joined to form a solid robust construction. The frame 41 has forwardly extending tube portions 43 with front and rear ends 44 and 45. The front ends 44 extend forward to a location proximal the front of each wheel 35. The rear ends 45 are secured to the outer surface of the sleeve 42. Right and left tubular risers 46 extend upwardly from the front ends 44. The risers 46 are generally linear in shape and about four feet (4') in length. The top portion of the risers 46 angle back to facilitate use by a worker. A handle 47 is formed at the top of the risers 46 for a worker to grip and control the movement of the cart 30. The handle 47 includes a trigger for activating and deactivating the electric drill 30, as discussed more fully below. The frame 41 includes a footpad 48 joined to and behind the wheel axle sleeve 42. The cart 30 can be a modified hand cart or a modified cart for transporting a jack hammer such as the model T1657 hammer cart manufactured by Robert Bosch, GmbH of Germany.

In the first embodiment, the nose piece 50 is formed by a nose plate 51. The nose plate 51 is joined to the lower front end 44 of the frame 41. The nose plate 51 is generally flat and rectangular in shape with front and rear ends 52 and 53, right and left sides 54, and upper and lower surfaces 55 and 56. The plate 51 is generally perpendicular to the risers 46, and its front end 52 is parallel to the wheel sleeve 42. The nose plate 51 has a side-to-side 54 width of about fourteen inches and an end-to-end length 52, 53 of about seven inches extending forward from the front end 44 of the frame 41. The plate 51 is 3/16 inch thick and made of rigid metal to maintain its shape and perpendicular orientation to the risers 46. Its rear end 53 is welded or otherwise rigidly and integrally secured to the frame 41. As a result of their integral or rigidly secured construction, the frame 41, risers 46, handle 47 and nose plate 51 rotate or otherwise move in fixed unison.

The nose plate 51 has a push bar 61. The push bar 61 has lower and upper ends, a front surface 63 and side surfaces 64. The cylindrical-shaped push bar 61 has a diameter of about one inch, and extends perpendicularly upward from upper plate surface 55. The metal push bar 61 is solid or tubular in construction, and its lower end is welded or otherwise rigidly joined to the nose plate 51. The push bar 61 has a length between its lower and upper ends of about five inches. The push bar 61 is located toward the middle of the plate 51, or about three inches from each plate end 52 and 53 and about six and a half inches from each plate side 54. When the cart 30 is positioned with its nose plate 51 proximal to the ground 2 and planar to ground level 4 and its risers 46 are vertical, the nose plate 51 can have a nose height even with the ground level 4 and the bottom of the wheel tread 36, or a nose height located a couple inches above ground level 4 and the bottom of the wheel tread 36 as shown in FIGS. 3 and 4.

Figure 1:
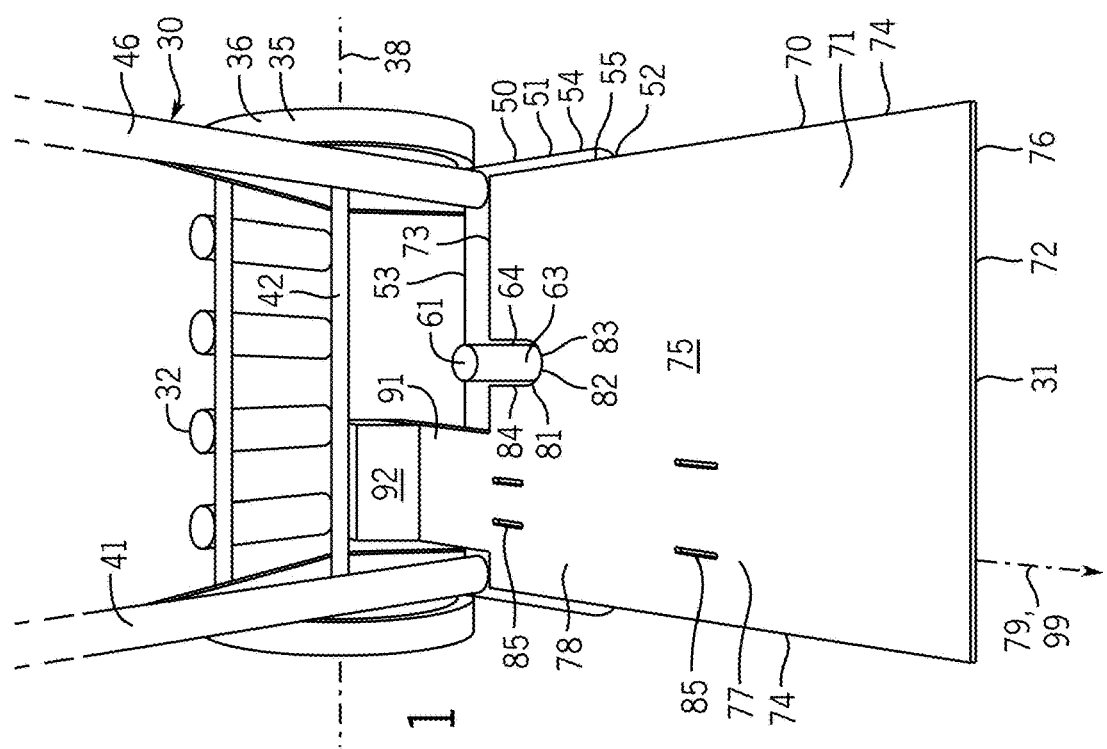
FIG. 1 is a perspective view showing a first embodiment of the drill cart having a frame with a handle, wheels, a nose plate, and a drill mounting plate laying on the nose plate.

The rebar hole doweling cart 30 has a drill mounting assembly 70 best shown in FIG. 1. The mounting assembly 70 secures the drill 20 to the cart 30 in such a way as to align and maintain the drill bit 28 and assembly 70 in a forward-facing aimed direction 99 as discussed below. In the first embodiment, the mounting assembly 70 is formed by a mounting plate 71 with front and rear ends 72 and 73, right and left sides 74, upper and lower surfaces 75 and 76, and front and rear portions 77 and 78. The rear portion 78 of the mounting plate 71 forms a slot or opening 81 to receive the push bar 61. The slot 81 has an upper portion 82, front end 83 and sides 84. The mounting plate 71 also has fastener openings 85. The front portion 77 of the plate 71 has two front openings 85, and the rear portion 78 of the plate 71 has two rear openings 85. The mounting plate 71 is preferably made of metal, and forms a rigid generally rectangular shaped plate structure. The mounting structure 71 has a thickness of about one-quarter inch, side-to-side width of about fourteen inches, and end-to-end length 72, 73 of one and a half feet. The mounting plate 71 preferably has a mesh or woven structure with a plurality of weaved openings (not shown). Each opening is about a half inch wide and a half inch long and has an oval or football shape when viewed from above. The mesh structure and openings in the mounting plate 71 keep gravel, sand and dirt from accumulating and packing between the plates 51 and 71 during use. When the mounting plate 71 has this meshed embodiment, the fastener openings 85 are formed by the weaved openings.

When the mounting plate 71 is placed on the nose plate 51, the plates are in parallel and generally planar alignment as shown in FIGS. 1-4. The mounting plate sides 74 are generally flush with the nose plate sides 54. While the rear portion 78 of the meshed plate 71 is positioned over and lays generally flat against the nose plate 51, its forward portion 77 extends beyond the nose plate front end 52 about ten inches. The mounting plate rear end 73 is slightly forward of the nose plate rear end 53. The mounting plate 71 is also held in a semi-locked position or aimed alignment 79 relative to the nose plate 51 of the cart 30. The outer ends or corners of the mounting plate rear end 73 abut the front surfaces of the cart risers 46, and the front end 83 of the slot 81 abuts the front surface 64 of the push bar 61 so that the mounting plate 71 cannot move rearwardly relative to the risers 46 and push bar 61. The sides 84 of the slot 81 are in snug, non-binding, abutting engagement with the side surfaces 65 of the push bar 61 to help resist lateral or side-to-side movement of the mounting plate 71. These abutments help form the semi-locked position 79 or aimed direction and alignment of the assembly 70 to prevent the meshed mounting plate 71 from moving laterally side-to-side or rotating (yaw) relative to nose plate 51, so that the mounting plate front end 72 remains parallel to the nose plate front end 52 and wheel axle of rotation 38. As discussed below, when the mounting plate 71 and drill bit 28 are held in an elevated position by the worker or a tapped hole 14, the nose plate 51 is free to rotate (pitch pivotal movement) down relative to the mounting plate 71.

The drill mounting plate 71 has a rearward extension or finger 91 that extends back to a location just below the wheel sleeve 42. One side of the finger 91 abuts the side of a riser 46 to help maintain the mounting plate 71 in lateral and rotational (yaw) alignment with the nose plate 51. The rear end of the finger 91 has an upwardly extending riser or block 92. When the nose plate 51 and mounting plate 71 are in parallel alignment as in FIG. 3, the top end of the riser block 92 abuts the lower surface of the sleeve 42. This engagement allows the shorter nose plate 51 to maintain its generally planar alignment with the longer mounting plate 71 when the cart 30 lifts the drill 20 to a desired hole height.

Fasteners 95 firmly hold the drill 20 to the mounting plate 71. The fasteners 95 are zip ties that pass through the mounting plate fastener openings 85 and around the drill housing 21 to firmly secure the drill 20 to the mounting plate 71 as shown in FIGS. 2-8. A first or forward fastener 95 secures a forward portion of the drill housing 21 to the plate 71, such as in the area of the housing neck 26. A second or rearward fastener 95 secures a rearward portion of the drill housing 21 to the plate 71, such as in the area of the handle hand opening 24. The drill 20 is in a laying or sideways position 96 when it is secured to the plate 71. The fasteners 95 can allow a small amount of forward and rearward movement of the drill 20 on the mounting plate 71 to accommodate the angular rotation of the push bar 61 relative to the plate 71 as discussed below. When firmly held to the mounting plate 71, the drill bit 28 is perpendicular to its front end 72.

The drill 20 and plate 71 are fixed to the cart 30 by the cooperating size and geometry of the push bar 61, slot 81 and hand opening 24, the abutting engagement of the outer rear ends of the plate 71 with the front of the risers 46, the side of the mounting finger 91 with the side of the riser 46 and fasteners 95, which secure the drill 20 and its aimed direction 28c and the mounting assembly 70 and its aimed direction 79 in forward-facing registered alignment 99. The drill bit 28 extends forward of the mounting plate front end 72 about one foot, and is perpendicular to the wheel axle of rotation 38 and plate ends 52 and 72. The drill hand opening 24 is directly over and in linear alignment with the upper end 82 of the slot 81, so that the push bar 61 extends through both the mounting plate slot 81 and drill hand opening 24. The abutments forming the assembly aimed direction of alignment 79 combine with the forward and rearward fasteners 95, the push bar 61 and size and geometry of the slot 81 and handle opening 24 to maintain the drill 20 and its bit 28 and its forward-facing or drill aimed direction 28c and assembly aimed direction 79 in registered alignment 99. When the drill 20 and mounting plate 71 are secured in this aimed registered alignment 99, both lateral or side-to-side movement of the drill 20, bit 28 and plate 71 are prevented, as well as their lateral rotational (yaw) movement relative to the cart 30, wheel axis of rotation 38 and nose plate 51. The drill bit 28, cart 30, nose plate 51 and mounting plate 71 share the same forward aimed alignment 28c, 79 and 99 when the plates 51 and 71 are in planar alignment, but do not restrict the downward and upward rotation (pitch pivotal movement) of the nose plate 51 relative to the mounting plate 71 when the cart handle 47 is pushed and pulled or stroked forward and backward.

Operation of First Embodiment of Rebar Hole Drilling Cart

Although the operation of the first embodiment of the rebar hole doweling cart 30 should be apparent from the above description, the following is provided to assist the reader in more readily understanding its operation to drill a rebar or dowel hole 10 in the side 9 of a concrete slab 7. Fasteners 95 secure the drill 20 to the mounting plate 71 so that the drill 20, drill bit 28 and plate 71 are in their registered forward-facing aligned direction 99 as shown in FIG. 2. The drill 20 is secured to the mounting plate 71, and the mounting plate is placed on and firmly held by the nose plate 51 in its semi-locked position 79 so that the drill bit direction 28c and mounting assembly direction are in registered alignment 99. The push bar 61 extends through the mounting plate slot 81 and drill hand opening 24. The cart 30 is rollably moved via its wheels 35 into the open area 17 in front of the concrete slab 7 so that the wheel axle of rotation 38 and nose plate front end 52 are in spaced parallel alignment with the slab wall 9 and the drill bit 28 and its drill bit direction 28c are in laterally perpendicular alignment (no yaw alignment) to the vertical slab wall 9.

The worker pulls back on the cart handle 47 to rearwardly tilt the cart 30 so that the plates 51 and 71 raise the drill 20 and its bit 28 to a desired hole height position 100 as in FIG. 3. The mounting assembly 70 and its aimed direction 79 and the drill bit 28 and its aimed direction 28c remain laterally perpendicular alignment with the slab wall 9 during the forward or backward rotation of the nose plate 51. The mounting assembly 70 and its aimed direction 79 and the drill bit 28 and its aimed direction 28c are also in a preferably longitudinally perpendicular alignment (non-pitched or non-sloped alignment) relative to the upper slab surface 8a during the forward or backward rotation of the nose plate 51. Still, it should be noted that the drill bit 28 can have a slight degree of upward pitch or slop (e.g., 5 to 10 degrees) relative to the slab surface 8a provided the drill bit 28 and hole 10 remain in the middle region 9b of the slab 7 without departing from the broad aspect of the invention. For example, a slight degree of upward slope would be present were the nose plate 51 even with the ground level 4 (flush with and resting on the ground 2) before raising the nose plate to position when the tip 28a of the drill bit 28 is at the desired hole height. The worker is now ready to use the cart 30 to drill a rebar or dowel hole 10. The worker activates the drill 20 by squeezing a drill activated lever located on the cart handle 47. The handle activation lever is in wired engagement with a cooperating drill activation lever engaging the drill trigger 25 as discussed more fully below. 2

With the drill 20 activated, the worker pushes the cart 30 forward 101 using his or her foot pressing against the foot pad 48 as shown in FIG. 4. This forward linear movement 101 of the cart 30 is preferably parallel to ground level 4 and forms a tap hole 14 into the vertical wall 9 of the slab 7 at the desired hole height located in the middle region 9b and preferably as close to the center 9a of the slab height. The pushing force of the worker's foot passes through the cart frame 41, nose plate 51 and push bar 61 to push the cart 30 and drill bit 28 forward 101 to form the tap hole 14. The depth of the tap hole 14 is relatively shallow, and preferably about ¼ to ½ inches deep. The tip 28a of the drill bit 28 is now supported by the tap hole 14 in the concrete slab 7. The tap hole 14 forms a tapped engagement 102 with the drill bit 28 that sets 103 the registered alignment 99 of the aimed directions 28c and 79 of the drill 20 and assembly 70. The drill bit 28 remains substantially in this set aimed direction 103 as the hole 10 is drilled to its desired depth 13.

Figure 5:
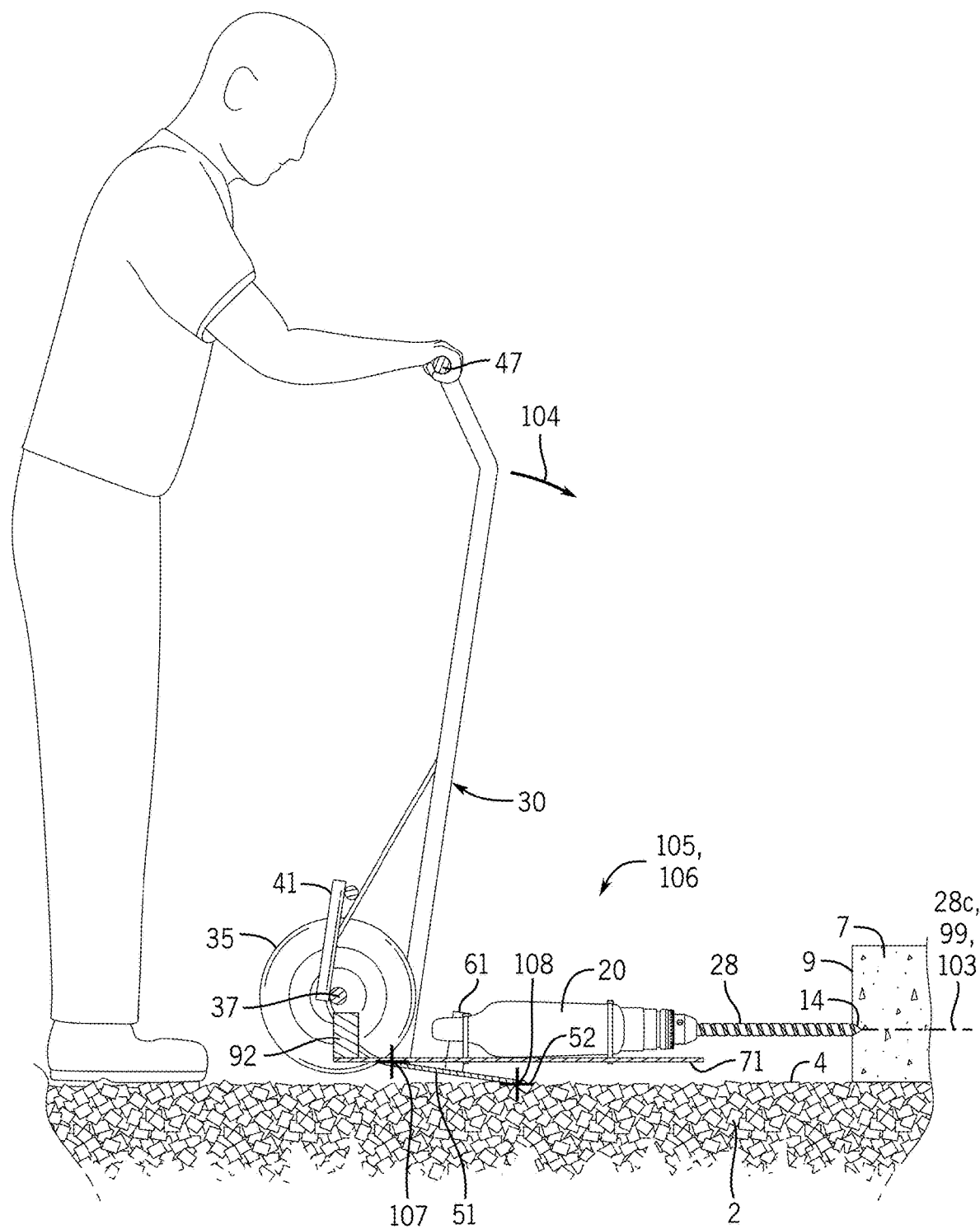
FIG. 5 is a side view of the first embodiment of the cart with the worker pushing or rotating the cart handle forward a necessary amount for the front end of the nose plate to rotate about a first pivot location (point or line) and into engagement with the ground to form a second pivot location (point or line) while the tip of the drill bit remains in the tap hole and in its set aimed direction.

The worker now pushes or rotates the cart handle 47 forward 104 to rotate and lower the nose plate 51 relative to the mounting plate 71 so that the nose plate front end 52 engages the ground 2 as in FIG. 5. During this initial forward rotation 104 of the cart 30, the nose plate 51 also rotates 104 into a ground engaging and gripping position 105. As the tip 28a of the drill bit 28 is fixed in the tap hole 14, the mounting plate 71 does not rotate relative to the ground 2 and concrete slab 7 so that it remains in the same set direction 99, 103, but does simultaneously counter-rotate 106 relative to the nose plate 51. The rotation 104 of the nose plate 51 and simultaneous counter-rotation 106 of the mounting plate 71 occur about two pivot locations or points 107 and 108, which preferably have a predetermined length given the components forming them. The mounting plate rear end 73 remains in abutting engagement with the lower ends of the cart risers 46 to form a first or assembly pivot point 107 is believed to be located proximal the rear ends 53 and 73 of the nose and mounting assembly plates 51 and 71. The second or nose pivot point 108 is formed by the engagement of the nose plate front end 52 with the ground 2. This forward rotation 104 of the cart 30 begins lifting the wheels 35 up from their engagement with the ground 2 and disengages the rear block 92 of the mounting plate 71 from the wheel sleeve 42. The mounting plate rear end 73 initially drops down (not shown)

and then lifts back up into the set aimed direction 103 (shown in FIG. 5) during this initial forward rotation 104. The tip 28a of the drill bit 28 remains fixed inside and supported by the tap hole 14.

Figure 6:
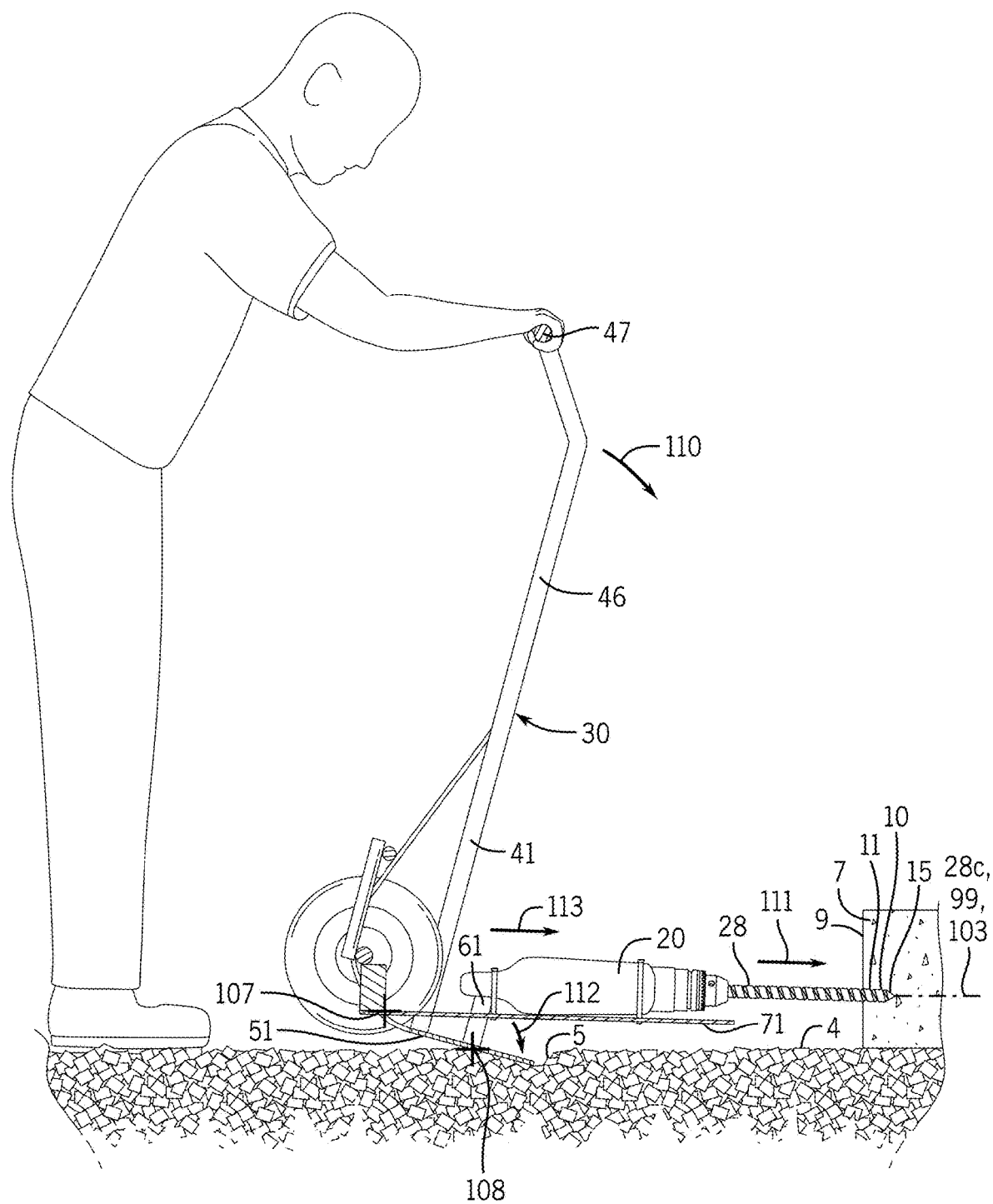
FIG. 6 is a side view of the first embodiment of the cart with the worker further pushing or rotating the cart handle forward with the front end of the nose plate gripping the ground along the second pivot point by forming a detent in the surface of the ground and pushing the drill bit further forward or deeper into the concrete slab while maintaining the drill bit at the set aimed direction.

When the nose plate 51 is in the ground engaging position 105 with the nose plate front end 52 griping the ground 2 at pivot point 108, the worker further rotates or strokes 110 the cart handle 47 forward to generate a leveraged force that drives the drill bit 28 into the concrete slab 7 to form, or partially form, the rebar hole 10 as shown in FIG. 6. As the nose plate 51 rotates about pivot point 108, the mounting assembly 70 simultaneously counter-rotates 106 relative to the nose plate 51 about assembly pivot point 107 to substantially maintain the set aimed direction 103 of the drill bit 28 and assembly 70. The drill bit 28 and mounting plate 71 remain in registered aimed alignment 99. During the forward pushing or rotation 110, the drill bit 28 is driven forward in a leveraged advancing motion 111. During this forward rotation or stroke 110, the worker pushes the cart handle 47 forward a linear distance of between one to two feet (1' to 2') and typically about one and a half feet or eighteen inches, which produces a drill bit advancement 111 into the concrete wall 9 of about two inches (2"). During the stroke 110, the wheels 35 of the cart lift about five to six inches (5" to 6") off the ground and the nose plate 51 rotates forward between thirty and fifty degrees (30° and 50°) toward the concrete slab 7. When the wheels 35 lift off the ground 2, the linear engagement of the front end 52 of the nose plate 51 about pivot line 108 gives the cart 30 lateral stability when forming the rebar holes 10. When applying a forward pushing force of about twenty to thirty (20 to 30) pounds, the duration of the stroke 110 is about twenty (20) seconds. It should be noted that during the stroking 110 of the cart handle 47, the set aimed direction 103 can realign or pitch upward (e.g., 5 to 10 degrees) relative to the slab surface 8a without departing from the broad aspect of the invention.

During each stroke 110, the front end 52 of the nose plate 51 digs or bites into the ground 2 to prevent or inhibit the front 52 of the nose plate 51 and cart 30 from moving backward. The force exerted by the nose plate front end 52 on the ground or substrate 2 is believed to form a detent 5 into the ground 2 to provide the gripping force that prevents backward movement of the nose plate front end. The detent 5 can be more or less pronounced depending on the condition (e.g., dry, wet, frozen) and type of substrate material 2 (e.g., dirt, sand, gravel). In this first embodiment, the drill advancing motion 111 includes a supplemental driving motion 113 caused by the forward rotation 112 of the push bar 61. As the cart 30 and nose plate 51 rotate forward 110, the drill handle 23 slides up the push bar 61. The forward rotation of the push bar 61 results in a forward movement 113 of the mounting plate 71, drill 20 and bit 28. This supplemental forward movement 113 of the drill 20 and the angular movement 112 of the push bar 61 is believed to alter the first or assembly pivot point 107. The assembly pivot point 107 is believed to move rearwardly along the mounting plate 71. The second or nose pivot point 108 is also believed to shift a slight amount back due to the formation of the detent 5. The amount of shift in the nose pivot point 108 is believed to depend on the size of the detent 5.

Figure 7:
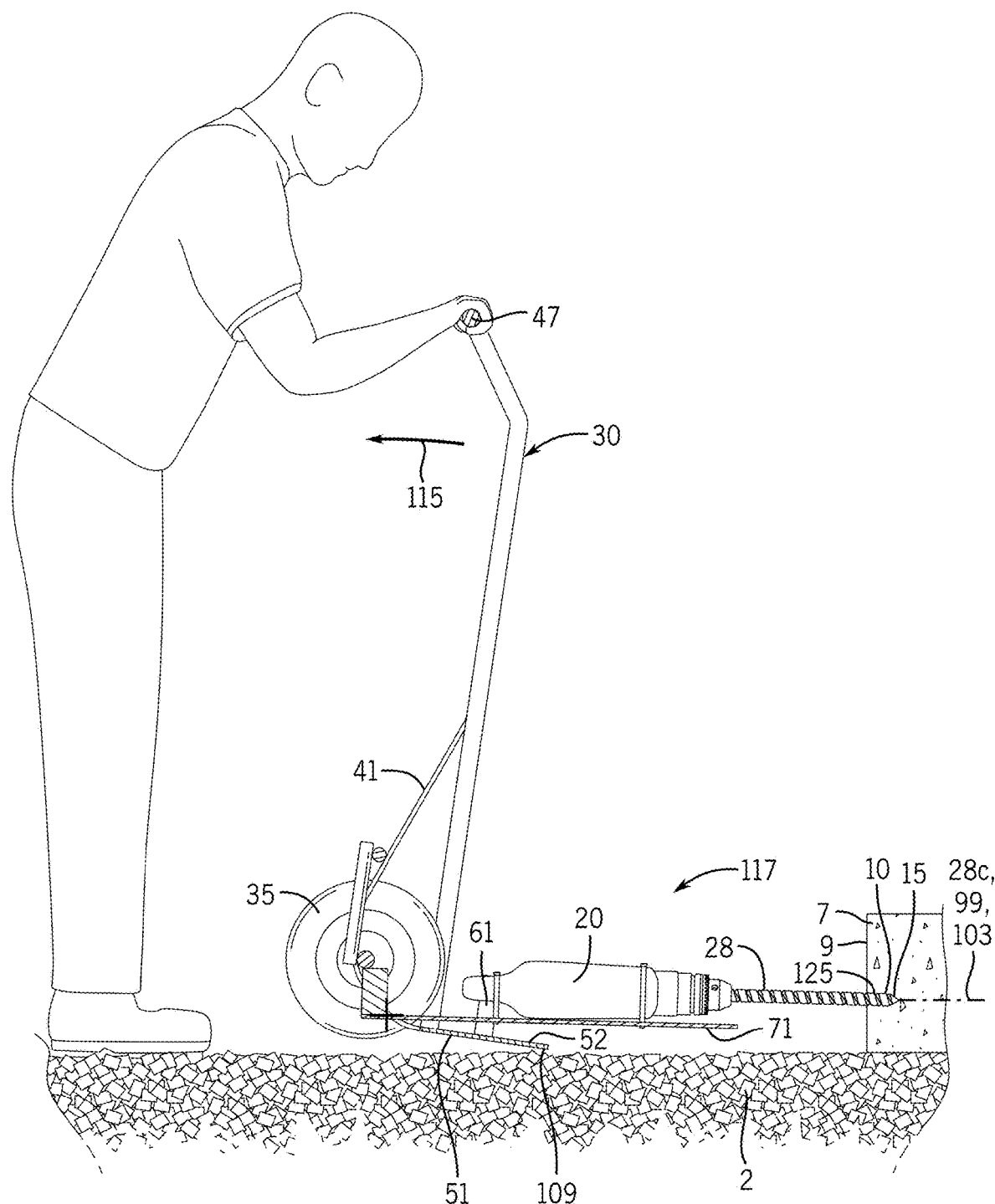
FIG. 7 is a side view of the first embodiment of the cart with the worker pulling or rotating the cart handle backward to pivotally raise the nose plate up from the ground toward the mounting plate, while the drill bit remains in its set aimed direction as the hole is sufficiently deep to maintain the bit in a horizontally locked position inside the hole.

A single stroke 110 and leveraged movement 111, 113 of the cart 30 is often insufficient to form the rebar hole 10 to its desired hole depth 13. When this occurs, the worker pulls or rotates the cart handle 47 backward 115 as shown in FIG. 7. This backward rotation 115, raises the nose plate 51 from engagement with the ground 2 while the drill bit 28 remains fixed inside the partially formed rebar hole 10. The backward rotation 115 of the cart handle 47 takes the worker only a second or two, and the drill bit 28 remains in the partially formed hole 10. The raised nose plate 51 puts the cart 30 and nose plate in a reset position 117 relative to the ground 2, and thereby advances the second pivot point 108 at a reset location 109 closer to the slab face 9. FIG. 8. During the backward stroke 115, the worker can place his or her foot on the footpad 48 to ensure the cart 30 does not move backward. The forward 110 and backward 115 rotation of the cart handle 47 complete the first full stroke of the handle. The cart handle 47 is now ready to repeat the initial tilting 104 and a repeat the forward pushing or stroking 120 to produce a repeat leveraged advancement 121, 123 of the drill 20 as shown in FIG. 8. This process of forward and backward pushing and pulling or stroking 110, 115, 120 of the cart handle 47 is further repeated, as needed, until the rebar hole 10 is formed to the desired hole depth 13. This embodiment of the rebar hole doweling cart 30 drills a half inch diameter rebar hole 10 to a depth of six inches (6") in about three strokes 110, 120, 120 in a total time duration of about sixty (60) seconds.

During the first stroke 110 of the handle 47, the drill bit 28 is believed to form the hole 10 to a sufficient bit aligning depth 15 for the tubular sides surface 11 of the hole 10 to maintain the drill bit 28 in a substantially set alignment position 125. During the backward rotation 115 of the cart handle 47, when the hole 10 is formed to this depth 15 and the bit 28 is in this set aligned position 125, the cart wheels 42 are raised off the ground 2 and the nose plate 51 disengages from engagement with the ground 2 as shown in FIG. 7.

Second Mid-Pivot Embodiment of Rebar Hole Doweling Cart

A second or mid-pivot embodiment of the rebar hole doweling cart 230 is shown in FIGS. 9-14. The cart 230 has front and rear ends 31 and 32, right and left wheels 35 and a frame 41. The cart 30 has a weight of about 20 pounds, a height of about forty inches, a width of about fourteen inches, and a length of about twenty inches, excluding the drill bit projection. Each wheel 35 has an outer tread surface 36 that rolls on the ground 2. The wheels 35 are about eight inches in diameter, either solid or pneumatic, and spaced apart to define the width of the cart 30. The wheels 35 rotate about a central axle 37 that forms a common axis of rotation 38. The frame 41 includes a ridged wheel axle sleeve 42 about one foot in length. The wheel axle 37 is held by bushings secured to or inside the tubular sleeve 42 in a conventional manner.

The frame 41 is preferably made of metal such as steel, and its components are welded or otherwise rigidly joined to form a solid robust construction. The frame 41 has a forwardly extending tube portion 43 with front and rear ends 44 and 45. The front end 44 extends forward to a location proximal the front of each wheel 35. The rear end 45 is secured to the outer surface of the sleeve 42. A single tubular riser 246 extends upwardly from the frame rear end 45. The riser 246 is generally linear in shape and about three feet in length, but can angle back toward its top end to facilitate the use of the cart 230 by a worker. A handle 247 is formed at the top of the riser 246 for a worker to grip and control the movement of the cart 230. The handle 247 includes a drill activation lever 247a to activate (turn on) and deactivate (turn off) the electric drill 20. The lever 247a is also used to control the speed (rpm) of the drill bit 28. The frame 41 includes a footpad 248 joined to and behind the wheel axle sleeve 42. The front end 44 of the frame 241 has a nose piece mounting bracket 249. The bracket 249 is firmly bolted 249a or otherwise rigidly joined to frame front end 44. The cart 30 can be a modified hand cart or a modified paint cart for transporting paint containers.

A nose piece 250 is rigidly joined to lower front end 44 of the frame 41. The L-shaped nose piece 250 is formed by integrally joined nose and securement plates 251 and 261. The nose plate 251 is similar to the nose plate 51 of the first embodiment, but is shorter in length. The plate 251 is generally flat and rectangular in shape with front and rear ends 52 and 53, right and left sides 54, and upper and lower surfaces 55 and 56. The plates 251 and 261 are perpendicular to each other, and the nose plate 251 is generally perpendicular to the riser 246. The front end 52 of the nose plate 251 is parallel to the wheel axle sleeve 42. The nose plate 251 is about one foot wide, five inches long, and extends forward from the front end 44 of the frame 241. The shape of the securement plate 261 is similar to that of the nose plate 251. The plate 261 is generally flat with upper and lower ends or portions 262 and 263, a middle portion 264, right and left sides, and front and rear surfaces. The securement plate lower end or bottom portion 263 is joined to the nose plate rear end 53 to give the nose piece 250 a rigid L-shape construction.

Figure 13:
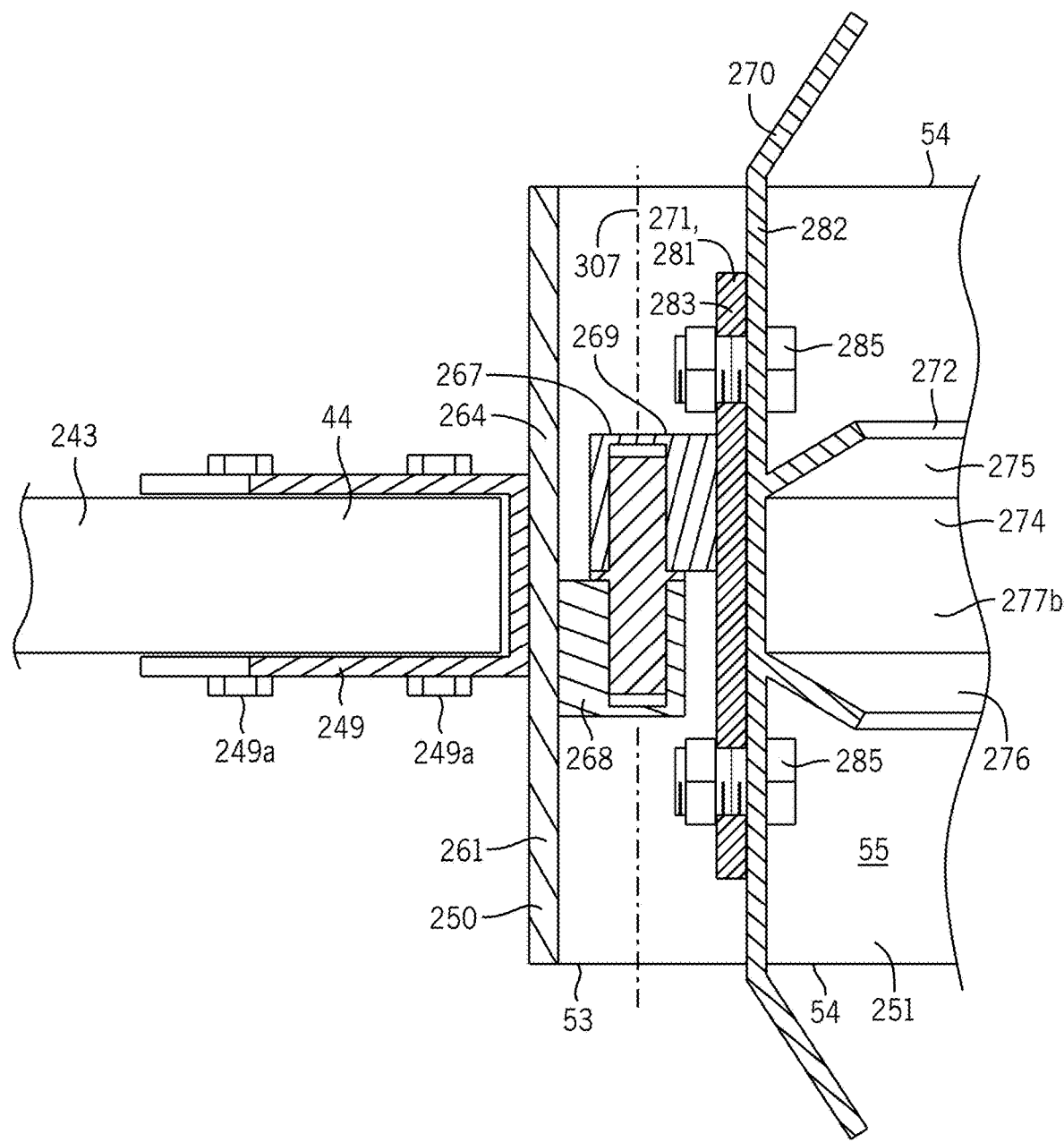
FIG. 13 is a sectional view taken along line 13-13 of FIG. 12 showing the cart frame joined to the nose plate, and the nose plate pivotally joined to the drill mounting assembly via a hinge.

The rear surface of the securement plate 261 is welded or otherwise rigidly secured to the frame bracket 249 as best shown in FIG. 13. The front surface of the securement plate 261 includes a hinge 267. The hinge 267 has pivotally joined first and second hinge portions 268 and 269. The first hinge portion 268 is rigidly joined to the front surface of the middle portion 264 of the securement plate 261. The second hinge portion 269 is rigidly joined to the drill mounting assembly 270. The first and second hinge portions 268 and 269 are pivotally joined. The location of the connection between the frame bracket 249 and nose piece 250 orients the nose plate 251 at a desired or set height relative to ground level 4. Although the nose plate 251 is shown even with ground level 4 when the frame riser 246 is vertical, it should be understood that the set height of the nose plate 251 can be elevated above ground level 4 as in the first embodiment.

The drill mounting assembly 270 is pivotally joined to the nose piece 250 as shown in FIG. 13. The mounting assembly 270 has a vertically oriented securement bracket 271 and a drill mounting frame 272. The second hinge portion 269 is welded or otherwise rigidly secured to the rear surface of the securement bracket 271. The bracket 271 and frame 272 are rigidly joined and move in unison. The securement plate 261 and bracket 271 are pivotally joined by hinge 267 to allow the bracket 271 and drill mounting frame 272 to rotate or pivot up and down (pitch pivotal movement) relative to the nose plate 251. The vertically oriented securement bracket 271 is spaced from the vertical securement plate 261 to allow a desired range of pivoting motion for the drill mounting assembly 270. The height of the securement bracket 261 can be shortened to further increase the range of rotational motion for the drill mounting assembly 270.

The rigid L-shaped drill mounting frame 272 is integrally formed by a vertically oriented rear frame portion 273 and a horizontally oriented lower frame portion 274. The rear portion 273 is perpendicular to the lower portion 274. The lower portion 274 is spaced from the horizontal nose plate 251 to further allow the desired range of pivoting motion for drill mounting assembly 270. Each frame portion 273 and 274 has spaced inwardly extending (toward drill 20) side walls 275 that form an L-shaped interior channel 276 with perpendicular rear and lower channel portions 277a and 277b. The side walls 275 sidewardly flared to give each channel portion 277a and 277b a V-shaped or U-shaped cross-sectional shaped construction. The electric hammer drill 20 is received and captured by the L-shaped channel 276. The rear end 20b of the drill 20 is received and captured by the rear channel portion 277a, and the top end 22a of the drill is received and captured by the lower channel portion 277b. The drill 20 is held by the drill mounting frame 272 in an inverted position 296 so that the drill bit 28 is closer to the ground level 4 during use.

The rear portion 273 of the drill mounting frame 272 includes a drill handle securing strut 278. The rear end of the securing strut 278 is bolted or otherwise rigidly secured to the upper end of the vertical rear portion 273 of the frame 272, or when a height adjustment mechanism 281 is provided, to the upper end of the upper section 282 of the securement bracket 271. The front end of the securing strut 278 is secured between the drill grip bar 27 and its removable portion 27a. A threaded pin (not shown) joining the grip bar 27 to its removable portion 27a is inserted through a hole (FIG. 12) in the forward end of the strut 278 to capture the strut and hold the drill 20 in the L-shaped channel 276.

Figure 12:
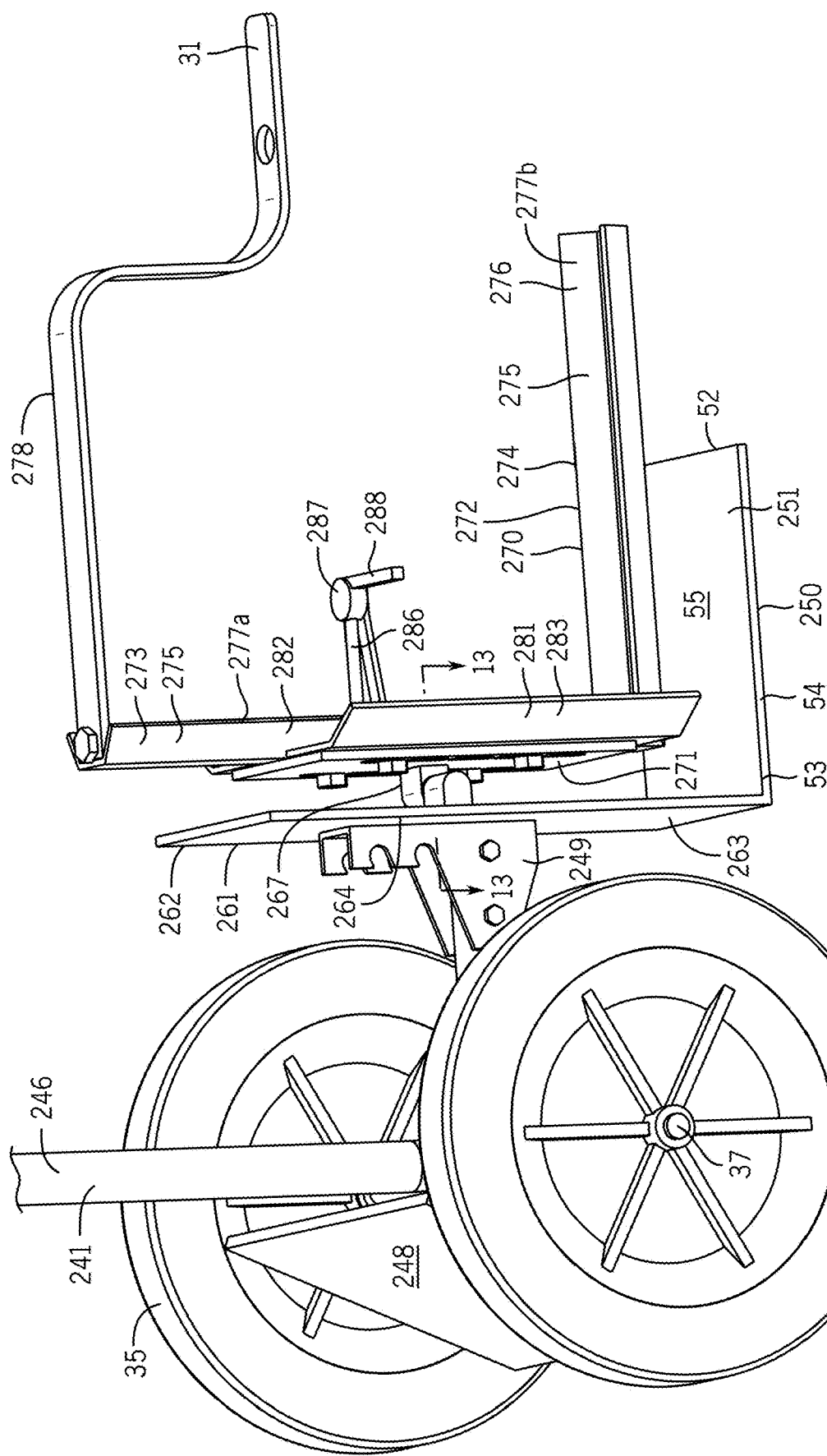
FIG. 12 is a perspective view of the mid-level hinge cart with the drill removed.
Figure 14A:
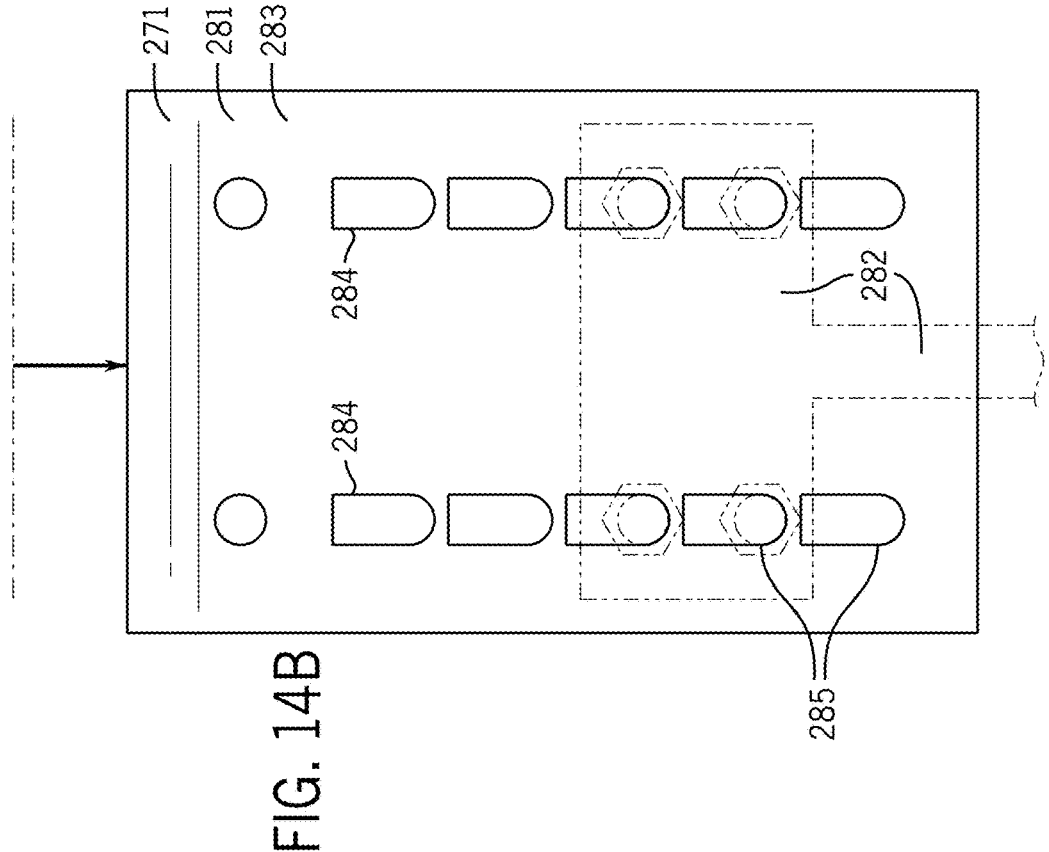
FIG. 14A shows the height adjustment mechanism set at a first drill bit height.
Figure 14B:
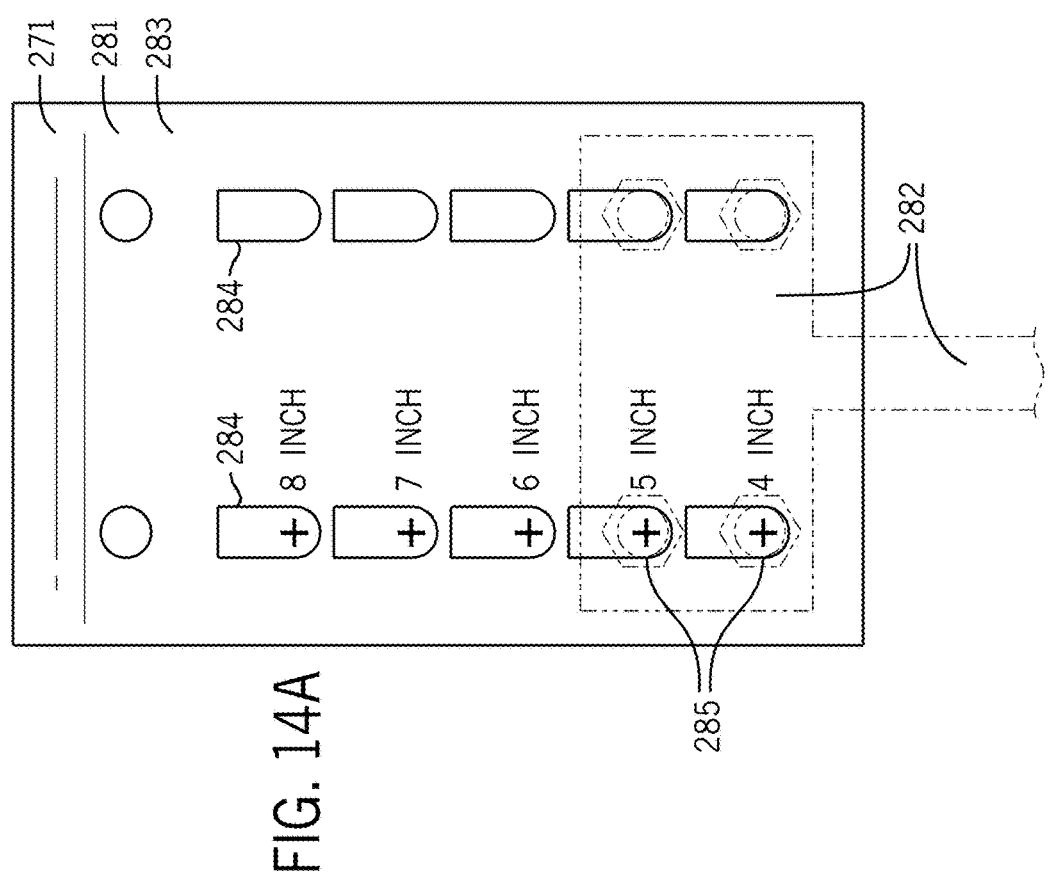
FIG. 14B shows the height adjustment mechanism set at a second drill bit height.

The securement bracket 271 is preferably formed by mated upper and lower sections 282 and 283 to provide a height adjustment mechanism 281 as best shown in FIGS. 12, 14A and 14B. The sections 282 and 283 are generally flat, and have uniformly spaced pairs of apertures 284. The aligned aperture pairs 284 receive bolts 285 to rigidly secure the plated 282 and 283 together. The lower section 283 is secured to the hinge 267, and the upper section 282 carries the drill mounting assembly 270 as best shown in FIGS. 12 and 13. The upper section 282 slides up or down relative the lower section 283 before they are bolted together to adjust them to a desired height setting, such as 4 inches, 5 inches, 6 inches, etc. These height settings correspond to the height of the drill bit 28 above ground level 4 when the wheels 35 and nose plate 251 of the doweling cart 230 rest on the ground 2 and the lower portion 273 of the drill mounting frame 272 is horizontally positioned and aimed so that the drill bit 28 is substantially horizontal when at the desired hole height and aimed at the side 9 of the concrete slab 7. The Height adjustment mechanism 281 selectively adjusts the height setting of the drill bit 28 at a desired drilling distance above ground level 4 to form dowel or rebar holes 10 into the center 9a or middle region 9b of the vertical side 9 of the concrete slab 7.

The cart 230 is preferably provided with a drill triggering mechanism 286. The drill triggering mechanism 286 is formed by a trigger bracket 287, movable trigger lever 288, a lever connecting wire 288a and a movable handle lever 289. The rear end of the trigger bracket 287 is secured to the securement bracket 271, or when the height adjustment mechanism 281 is provided, to the upper section 282 of the height adjustment mechanism. The front end of the trigger bracket 287 holds the trigger lever 288. The trigger lever 288 is positioned to engage the drill trigger 25. In a manner similar to a bicycle wheel brake, one end of the wire 288a is firmly joined to the selectively movable handle lever 289 secured to the cart handle 247, and the other end of the wire 288a is firmly joined to the selectively movable trigger lever 288. When the worker squeezes the handle lever 289, the trigger lever 288 pushes into and depresses the drill trigger 25 to activate the drill 20. When the worker releases the handle lever 289, the trigger lever 288 is biased to pull back from and release engagement with the drill trigger 25 to deactivate the drill 20. For some drills 20, the amount the worker squeezes the handle lever 289 can control the speed (rpm) of the drill 20 and its bit 28.

Operation of Second Embodiment of Rebar Hole Doweling Cart

Figure 9:
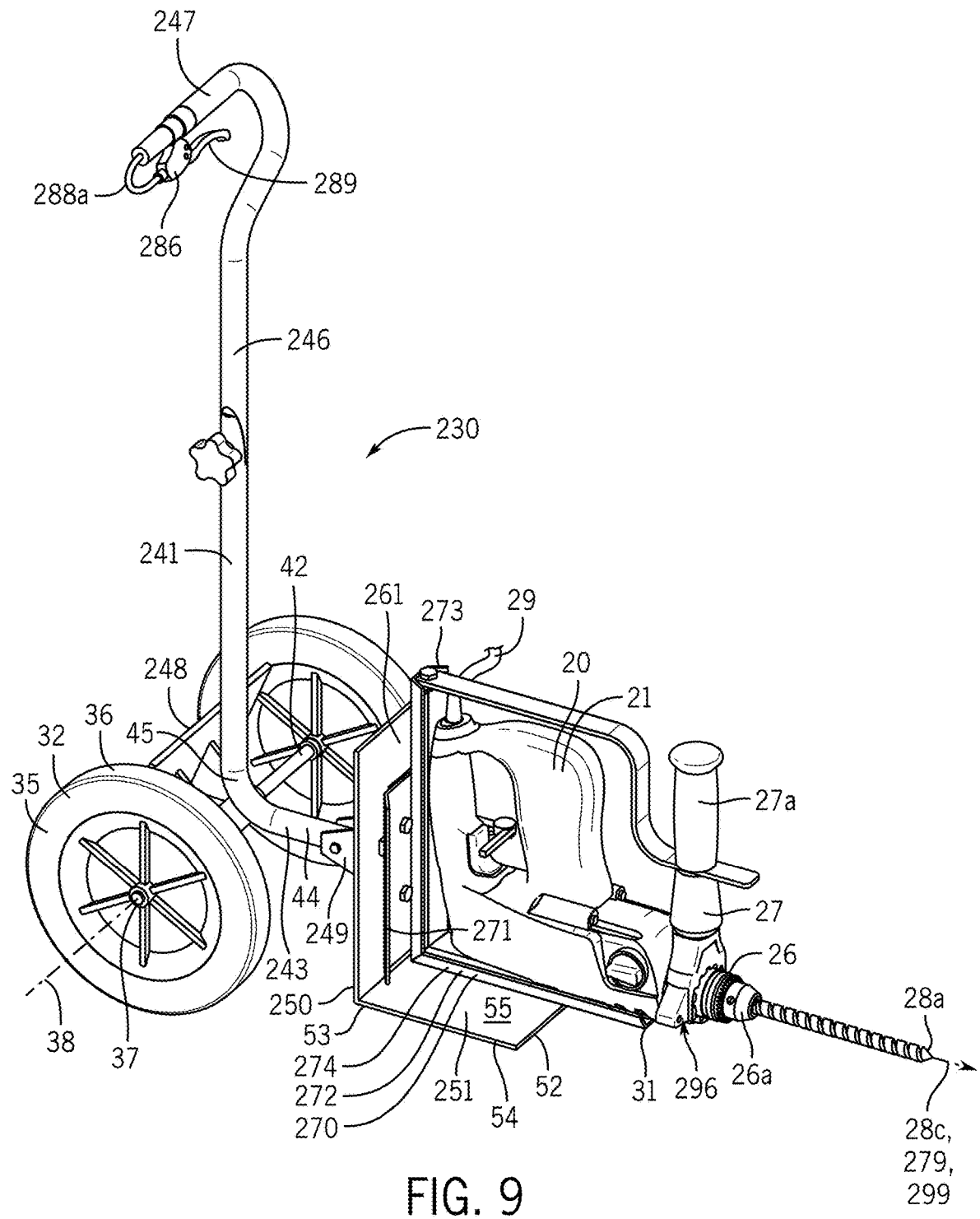
FIG. 9 is a perspective view of a second mid-level hinge embodiment of the cart having a frame with a handle, wheels, a nose plate, and a drill mounting assembly holding a hammer drill in an inverted upright position.

The drill 20 is firmly held by the mounting assembly 270 in an inverted position 296 as shown in FIG. 9. With nose plate 251 resting flush on the ground 2 and the lower frame portion 274 of the drill mounting assembly 270 lifted to a substantially horizontal position, the height adjustment mechanism is set with the bit 28 at a desired hole height position 300 that is substantially vertically centered 9*a* or within the middle region 9*b* of the side 9 of the concrete slab 7. The cart 230 is positioned in the open area 17 in front of the concrete slab 7 so that the wheel sleeve 42 is parallel to the side 9 of the slab 7 and the drill bit 28 is in laterally perpendicular alignment (no yaw alignment) to the vertical slab wall 9. The worker is now ready to use the cart 30 to drill a rebar hole 10. Before forming the tap hole 14, the worker rotates the cart handle 247 to aim the drill bit 28 at the desired hole height 100 position in a manner similar to FIG. 3. With the lower frame portion 274 resting on the nose plate 251, the worker pulls back on the handle 247 to rearwardly tilt the cart 230 so that plate 251 and frame portion 274 raise the drill 20 and its bit 28 to the desired hole height position 100. The worker squeezes the handle lever 249 to activate the drill 20.

Figure 10:
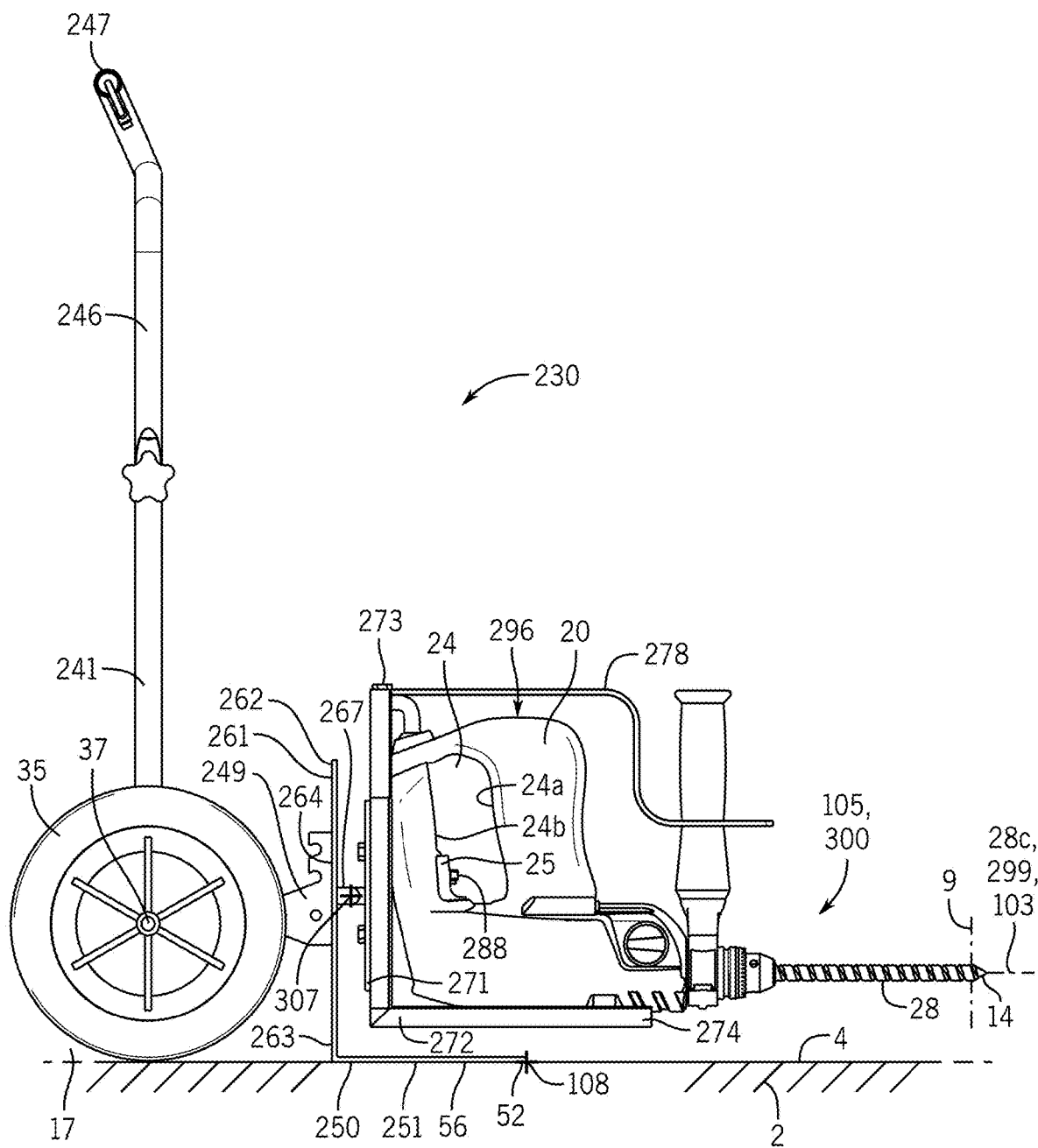
FIG. 10 is a side view of the mid-level hinge cart with the drill bit raised to a desired hole height and being pushed forward to form a tap hole and placing the drill bit in a set aimed direction.

With the drill 20 activated, in a manner similar to FIG. 4, the worker pushes the cart 30 forward 101 using his or her foot pressing against the foot pad 248 to form a tap hole 14 into the vertical wall 9 of the slab 7 at the desired hole height. The pushing force of the worker's foot passes through the cart frame 241, nose piece 250 and mounting assembly 270 to push the drill bit 28 forward 101 to form the tap hole 14. Again, the depth of the tap hole 14 is relatively shallow, and preferably ¼ to ½ inch deep. The tip 28*a* of the drill bit 28 is now supported by the tap hole 14 in the concrete slab 7, and the nose plate 251 is lowered into engagement 105 with the ground 2 as shown in FIG. 10. The tap hole 14 forms a tapped engagement 102 with the drill bit 28 that sets 103 the registered alignment 299 of the aimed directions 28*c* and 279 of 18 the drill 20 and assembly 270. The drill bit 28 remains substantially in this set aimed direction 103 as the hole 10 is drilled to its desired depth 13.

The front end 252 of the nose plate 251 is in ground engaging position 105, so that the cart 230 has the two pivot points. The first or assembly pivot point 307 is formed by the hinge 267. As in the first embodiment, the second or nose pivot point 108 is formed by the gripping engagement of the nose plate front end 252 with the ground 2.

Figure 11:
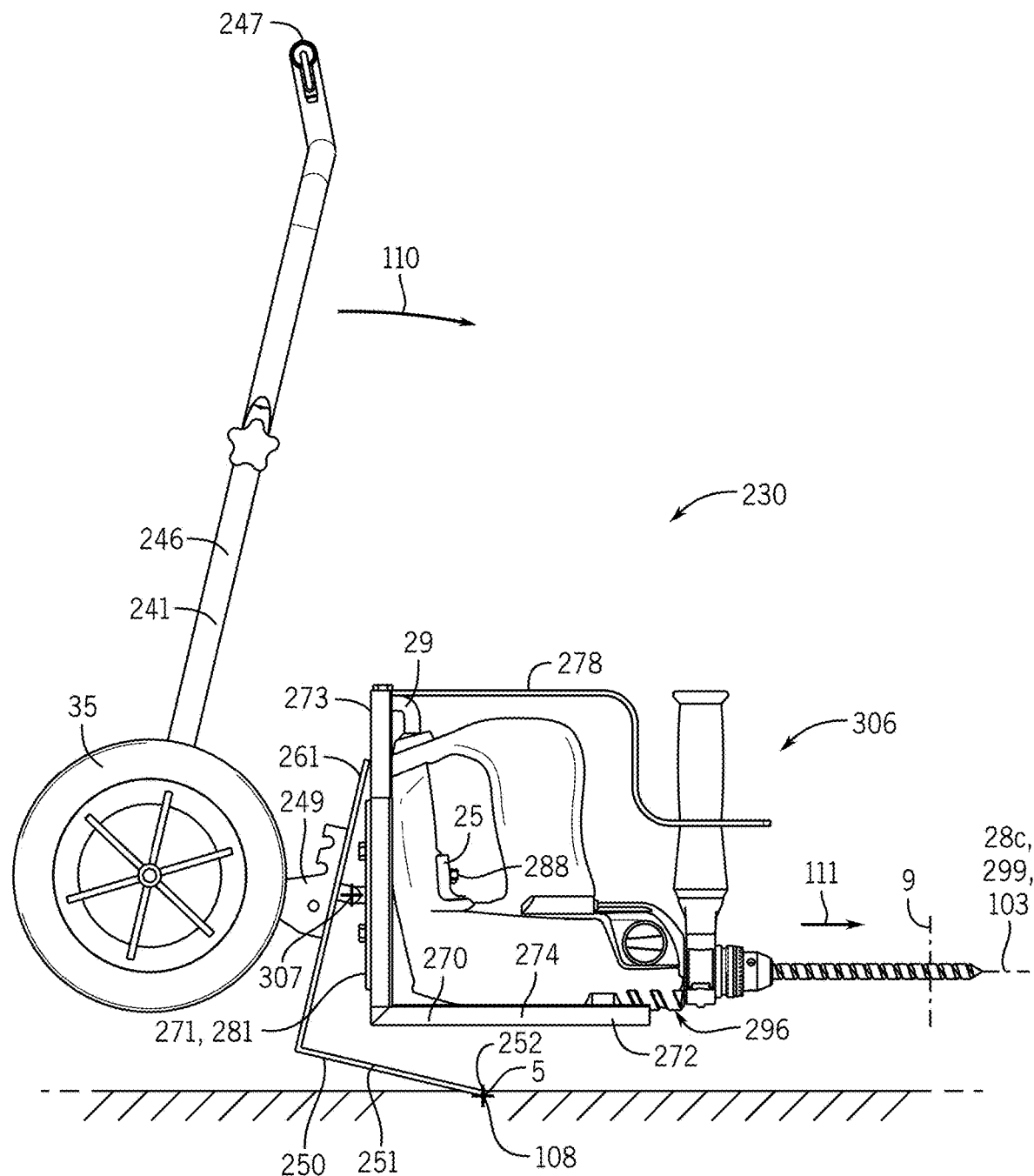
FIG. 11 is a side view of the mid-level hinge cart with the handle pushed or rotated forward so that the front of the nose plate forms a detent in and grips the ground to advance the drill bit deeper into the concrete slab.

With the nose plate 251 in its ground engaging position 105 with the nose plate front end 252 griping the ground 2 at pivot point 108, the worker pushes or strokes 110 the cart handle 247 forward to generate a leveraged force that drives the drill bit 28 into the concrete slab 7 to form, or partially form, the rebar hole 10 as shown in FIG. 11. As the nose plate 251 rotates about pivot point 108, the mounting assembly 270 simultaneously counter-rotates 106 relative to the nose plate 251 about assembly pivot point 307 to substantially maintain the set aimed direction 103 of the drill bit 28 and assembly 270. The drill bit 28 and lower portion 274 of the mounting frame 272 remain in registered aimed alignment 99. During the forward pushing or rotation 110, the drill bit 28 is driven forward in a leveraged advancing motion 111. As in the first embodiment, during this forward rotation or stroke 110, the worker pushes the cart handle 47 forward a linear distance of between one to two feet (1' to 2') and typically about one and a half feet or eighteen inches, which produces a drill bit advancement 111 into the concrete 9 of about two inches (2"). During the stroke 110, the wheels 35 of the cart lift about five to six inches off the ground and the nose plate 51 rotates forward between thirty and fifty degrees (30° and 50°) toward the concrete slab 7. When applying a forward pushing force of about twenty to thirty pounds, the duration of the stroke 110 is about twenty (20) seconds. It should be noted that during the stroking 110 of the cart handle 47, the set aimed direction 103 can realign or pitch upward (e.g., 5 to 10 degrees) relative to the slab surface 8*a* without departing from the broad aspect of the invention.

Again, a single stroke 110 and leveraged movement 111 of the cart 30 is often insufficient to form the rebar hole 10 to its desired hole depth 13. When this occurs, the worker pulls or rotates the cart handle 247 backward 115 as in FIG. 7. The backward rotation 115 of the cart handle 247 takes the worker only a second or two, and the drill bit 28 remains in the partially formed hole 10. While using the footpad 248 to maintain the drill bit 28 in the partially formed hole, the worker pulls the handle back 115 to reset 117 the front 52 of the nose plate 251 relative to the ground 2, and thereby advance the second pivot point 108 at a reset location 109 closer to the slab face 9. During the backward stroke 115, the worker can use the footpad 48 to ensure the cart 30 does not move backward. The forward 110 and backward 115 rotation of the cart handle 247 complete the first full stroke of the handle. The cart 230 is now ready for a repeat forward pushing or stroking 120 of the handle 247 for a repeat leveraged advancement 121 of the drill bit 28 as in FIG. 8. This process of forward and backward pushing and pulling or stroking 110, 115, 120 of the cart handle 247 is further repeated, as needed, until the rebar hole 10 is formed to the desired hole depth 13. As in the first embodiment, the doweling cart 230 can drill a half inch diameter rebar hole 10 to a depth of six inches (6") in about three strokes 110, 120, 120 in a total time duration of about sixty (60) seconds.

Third Elevated-Pivot Embodiment of Rebar Hole Dowling Cart

Figure 15:
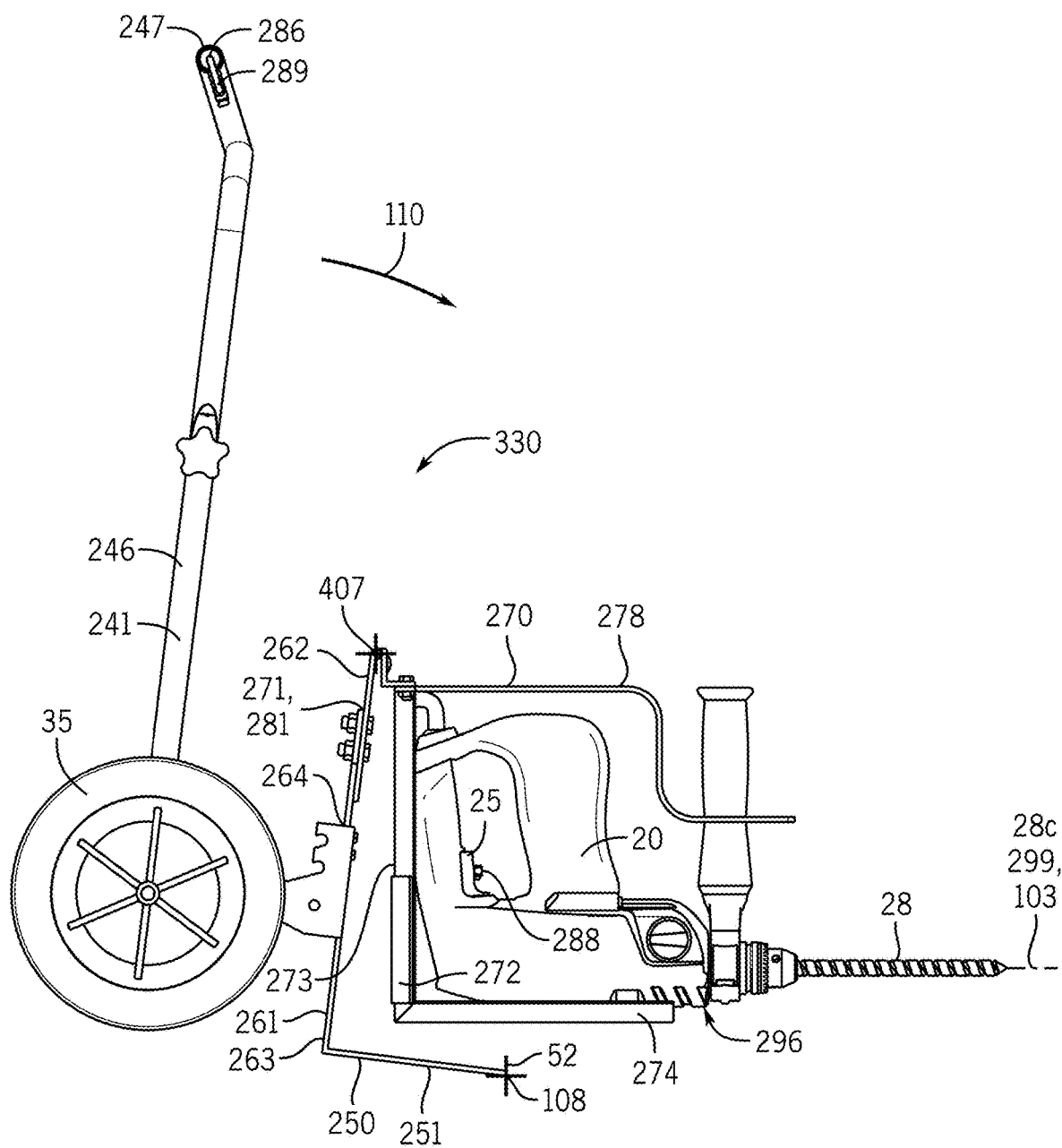
FIG. 15 is a perspective view of a third elevated hinge embodiment of the cart having a frame with a handle, wheels, a nose plate, and a drill mounting assembly with the elevated hinge joining the nose plate to the drill mounting assembly at a higher location.

A third or elevated-pivot embodiment of the rebar hole doweling cart 330 is shown in FIG. 15. The elevated pivot embodiment 330 has the same construction as the mid-pivot embodiment 230, except that the first pivot point 307 is moved to an elevated location 407 by relocating the hinge 267 to a location at the upper end or top portion 262 of the securement plate 261 or bracket 271 and the drill mounting frame 272. The first hinge portion 268 is welded or otherwise rigidly secured to the securement plate 261 or bracket 271, or to the rear end of the drill handle securing strut 278. The second hinge portion 269 is welded or other otherwise rigidly secured to the top of the rear portion 273 of the mounting assembly 270. By locating the hinge 267 and first pivot point 407 at this top portion 262 location, the cart 330 is free to rotate or pivot forward 210 a greater amount or distance as there is nothing to obstruct the amount or degree of rotation in each stroke 110, 120.

Fourth Flex-Pivot Embodiment of Rebar Hole Doweling Cart

Figure 16:
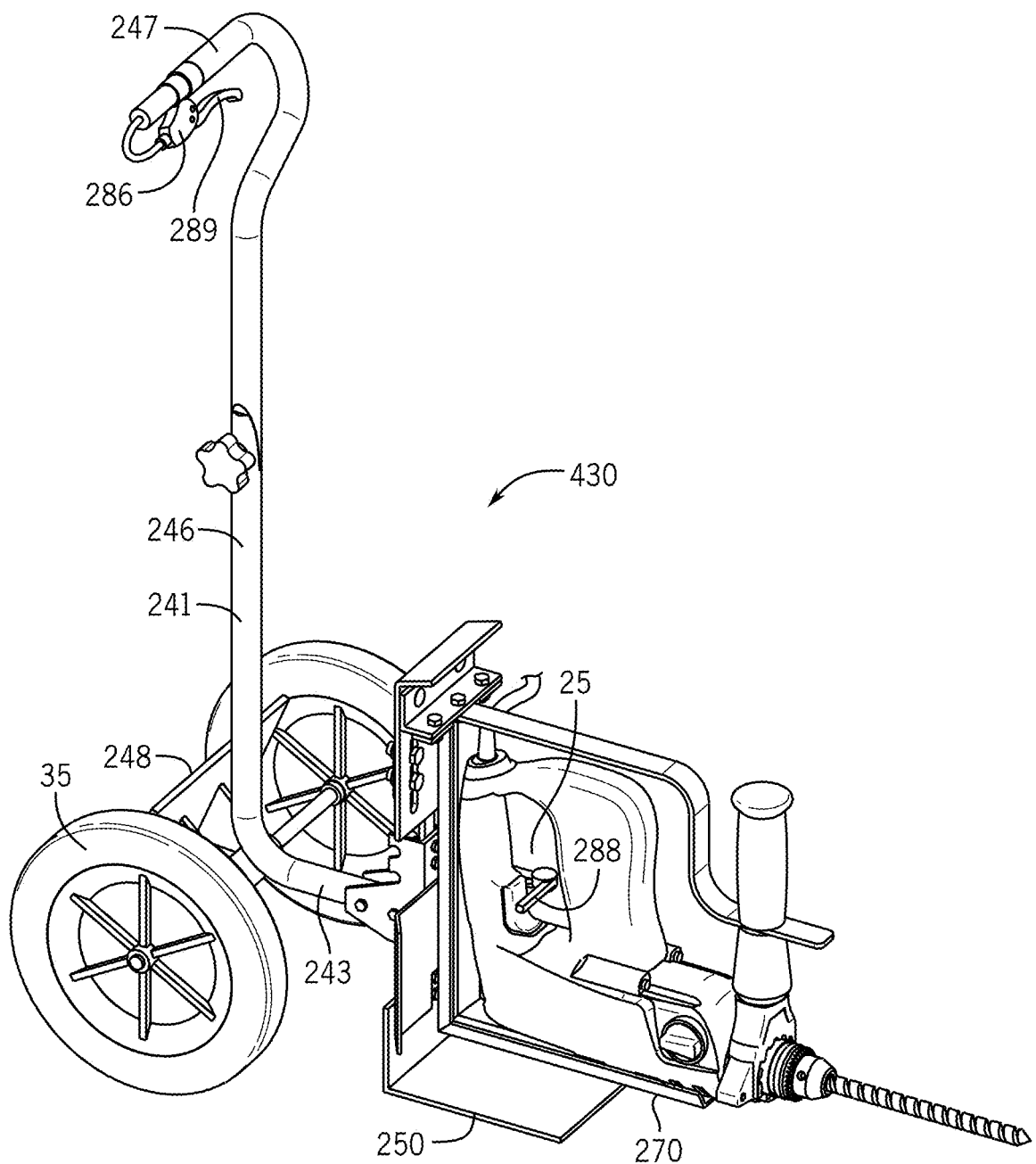
FIG. 16 is a perspective view of a fourth flex-pivot embodiment of the cart having a frame with a handle, wheels, a nose plate, and a drill mounting assembly holding a hammer drill in an inverted upright position.
Figure 17:
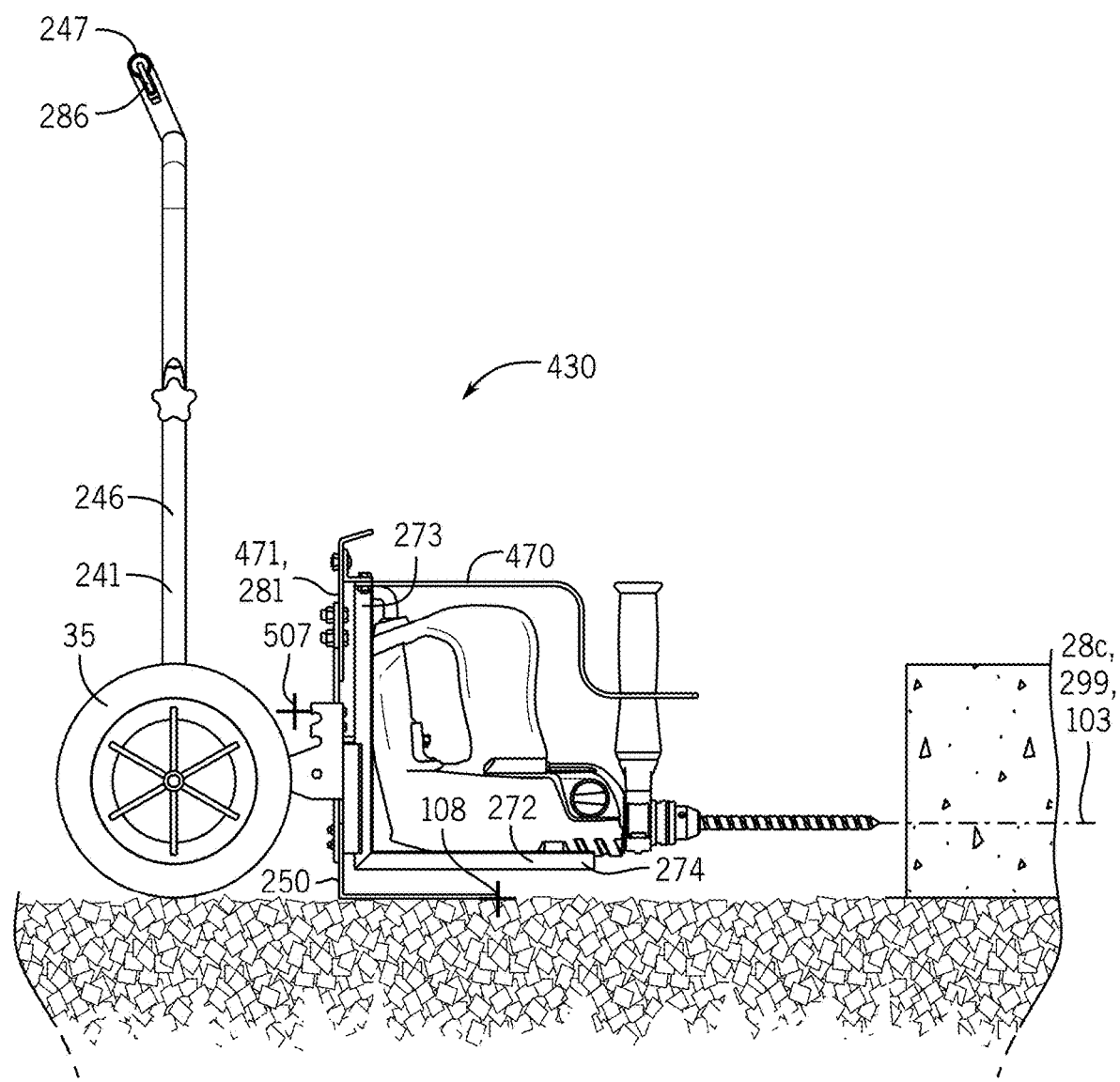
FIG. 17 is a side view of the flex-pivot cart with the drill bit raised to a desired hole height just prior to being pushed forward to form a tap hole and placing the drill bit in a set aimed direction.
Figure 18:
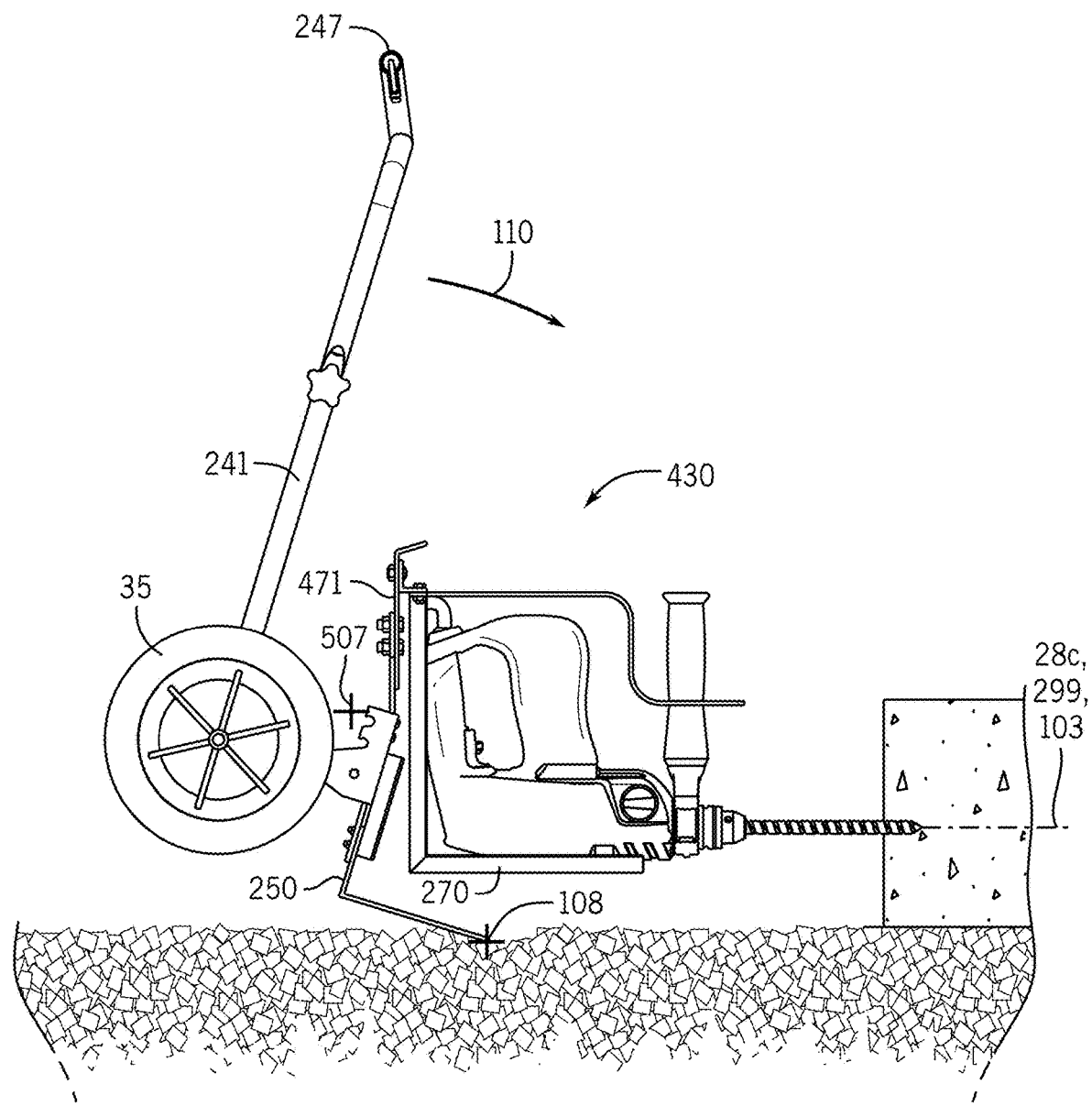
FIG. 18 is a side view of the flex-pivot cart with the handle pushed or rotated forward so that the front of the nose plate forms a detent in and grips the ground to advance the drill bit deeper into the concrete slab.

A fourth or flex-pivot embodiment of the rebar hole doweling cart 430 is shown in FIGS. 16-18. The flex-pivot embodiment 430 has the same basic construction as the second embodiment 230, except the hinge 267 is removed and the securement bracket 471 has flexible construction so that the first pivot point 307 becomes a floating pivot point 507. The frame bracket 249 is welded or otherwise rigidly secured to the rear surface of the securement bracket 471. The bending or flexing of the securement bracket 471 produces a floating pivot point 507 defined by the arc of the bend in the securement bracket as shown in FIG. 18. The location of the floating pivot point 507 is believed to depend on the length and material properties of the securement bracket 471, and the height of the riser 246 and the amount of pushing force applied by the worker to the handle 246 when stroking 110, 120 the handle 247 of the cart 430.

While the invention has been described with reference to preferred embodiments, it will be understood by those skilled in the art that various changes may be made and equivalents May be substituted without departing from the broader aspects of the invention. For example, while the majority of the drawing figures show side views of the carts 30, 230, 330 and 430, so that the pivot locations 107, 108, 307, 407 and 507 appear as pivot points, it should be understood that these pivot locations are preferably pivot lines, particularly given the shapes and lengths of the components forming them, such as the nose plate front end 51, 251 forming pivot location 108.

I claim:

1. A rebar hole doweling cart that holds a drill for drilling rebar or dowel holes into a concrete slab with a slab side and generally planarly aligned upper and lower slab surfaces, an area of ground in front of the slab side, the slab side having a slab side middle region spaced from the slab surfaces, the drill having a front drill end and a drill bit extending from the front drill end in a drill aimed direction, the rebar hole doweling cart comprising:

a cart frame adapted to engage the ground, said frame having an elongated upwardly extending cart riser with a cart handle, said cart handle being adapted to be gripped by a worker;

a nose piece rigidly secured to said cart frame, said nose piece having a nose plate with a front nose end, said front nose end being forward of said cart frame, said nose plate, cart riser and cart handle selectively rotating in fixed unison, said front nose end forming a nose pivot point, and said nose plate front end is adapted to selectively engage and grip the ground about said nose pivot point when said cart handle is pushed forward and selectively release from gripping engagement with the ground when said cart handle is pulled back;

a drill mounting assembly pivotally secured to either one of said nose piece and said frame to allow assembly pitch pivotal movement relative to said nose plate, said mounting assembly having an assembly aimed direction perpendicular to said front nose end, said mounting assembly firmly holding the drill with the drill aimed direction in parallel alignment with said assembly aimed direction, and said mounting assembly positioning the drill bit laterally perpendicular to said front nose end and forward said nose plate pivot point, said mounting assembly having a substantially set aimed direction when the drill bit is in tapped engagement with the slab side middle region, said assembly pitch pivotal movement being in simultaneous counter-rotation to said forward rotation of said nose plate to maintain said mounting assembly and drill aimed directions in said set aimed direction when said handle and nose plate are rotated in fixed unison about said nose pivot point;

wherein said cart is adapted to move to the area in front of the slab side with said drill bit in tapped engagement with the slab side middle region, said assembly and drill aimed directions being in laterally perpendicular alignment with the slab side middle region and substantially parallel alignment with the slab surfaces; and, wherein said cart handle is adapted to be pushed forward to rotate said cart frame and nose plate about said nose pivot point to forwardly advance said drill mounting assembly and the drill bit to form the rebar or dowel hole into the slab side middle region, said assembly and drill aimed directions being substantially maintained in said set aimed direction and in substantially planar alignment with the slab surfaces during said assembly pitch pivotal movement.

2. The rebar hole doweling cart of claim 1, and wherein the drill has a housing with first and second drill sides and a hand opening, and wherein said nose plate has an upwardly extending push bar, and said mounting assembly has a mounting plate with a bar opening, said mounting plate being firmly secured in registered alignment with said nose plate, said mounting plate firmly holding the drill in a sideways drill position, and said push bar extending through said bar opening and said handle opening.

3. The rebar hole doweling cart of claim 1, and wherein the drill has upper and rear drill ends, said nose piece has a securement plate extending upwardly from said nose plate, and said drill mounting assembly has a securement bracket and a drill mounting frame, said securement bracket is pivotally joined to said securement plate to allow said simultaneous counter-rotation of said mounting assembly relative to said nose plate, said drill mounting frame has rear and lower channel portions that form an L-shaped channel, the drill being firmly secured to said mounting frame in an inverted drill position with said upper drill end being held by said lower channel portion and said rear drill end being held by said rear channel portion.

4. The rebar hole doweling cart of claim 3, and wherein said securement bracket has a middle portion, said securement bracket is pivotally joined to said securement plate by a hinge, and said hinge is fixed to said middle portion of said securement bracket.

5. The rebar hole doweling cart of claim 3, and wherein said securement bracket has a top portion, said securement bracket is pivotally joined to said securement plate by a hinge, and said hinge is fixed to said top portion of said securement bracket.

6. The rebar hole doweling cart of claim 3, and wherein said securement bracket is flexible, and said securement bracket is pivotally joined to said securement plate by a flex pivot.

7. The rebar hole doweling cart of claim 3, and wherein the lower slab surface is at ground level and said securement bracket has a height adjustment mechanism to adjustably set the drill bit at a desired bit height, said desired bit height being even with the slab middle when said cart is placed at ground level in the area in front of the slab side.

8. The rebar hole doweling cart of claim 3, and wherein the drill has a grip bar with a removable portion, and wherein said securement bracket has an upper bracket end and includes a drill handle securing strut with first and second strut ends, said first strut end being rigidly secured to said upper bracket end, and said second strut end is secured between the drill grip bar and said removable portion of said grip bar.

9. The rebar hole doweling cart of claim 1, and wherein the drill bit reaches a first bit depth when said cart handle is rotated forward about said nose pivot point, and said cart handle rotates back to forwardly advance said nose plate toward the slab wall to engage the ground at a reset nose plate pivot point, and said cart handle rotates forward a second time about said reset pivot point to further forwardly advance the drill bit to a second deeper bit depth.

10. The rebar hole doweling cart of claim 1, and wherein the slab side is perpendicular to the upper surface of the slab, and said substantially set aimed direction remains within an angular range of 0 to 10 degrees of parallel with the slab upper and lower surfaces.

11. The rebar doweling cart of claim 1, and wherein said cart frame is rotatably supported by spaced apart wheels with a common wheel axis of rotation, said wheels being adapted to roll on the ground, said cart riser extending upwardly from said wheel axis of rotation, and said wheels lift off the ground when said handle is rotated forward, and said front nose end has a length of about one foot to provide lateral stability when said wheels lift off the ground.

12. The rebar hole doweling cart of claim 1, and wherein the drill has a drill trigger selectively movable to activate the drill, and further including a drill triggering mechanism with a trigger bracket, movable bracket lever, movable handle lever and a wire joining said bracket lever and said handle levers, said trigger bracket and bracket lever being secured to said mounting assembly with said trigger lever engaging the drill trigger, and said handle lever being located on said cart handle, and wherein movement of said handle lever moves said bracket lever to activate the drill trigger.

13. The rebar hole doweling cart of claim 1, and wherein said frame includes a footpad to form a tap hole in the slab side to set said substantially set aimed direction.

14. The rebar hole doweling cart of claim 13, and wherein said cart handle is adapted to be pulled back to raise said nose plate, mounting assembly and drill, and elevate said drill bit to said set aimed direction before moving into tapped engagement with the slab wall.

* * * * *